(12) United States Patent
Wang et al.

(10) Patent No.: US 11,245,634 B2
(45) Date of Patent: Feb. 8, 2022

(54) TIME-SENSITIVE NETWORKING (TSN) PACKET FORWARDING

(71) Applicant: Huawei Technologies Co., Ltd., Shenzhen (CN)

(72) Inventors: Tongtong Wang, Beijing (CN); Nan Li, Beijing (CN); Norman Finn, Spring Valley, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/861,988

(22) Filed: Apr. 29, 2020

(65) Prior Publication Data

US 2020/0259755 A1 Aug. 13, 2020

Related U.S. Application Data

(63) Continuation of application No. PCT/CN2017/109582, filed on Nov. 6, 2017.

(51) Int. Cl.
*H04L 1/00* (2006.01)
*H04L 12/841* (2013.01)
(Continued)

(52) U.S. Cl.
CPC .......... *H04L 47/283* (2013.01); *H04L 47/621* (2013.01); *H04L 49/252* (2013.01); *H04L 49/3027* (2013.01)

(58) Field of Classification Search
CPC ... H04L 47/283; H04L 47/621; H04L 49/252; H04L 49/3027
See application file for complete search history.

(56) References Cited

U.S. PATENT DOCUMENTS 9,455,933 B2   9/2016 Finn et al.
9,485,118 B1   11/2016 Atlas et al.
(Continued)

FOREIGN PATENT DOCUMENTS

CN   1452357 A    10/2003
CN   101119492 A   2/2008
(Continued)

OTHER PUBLICATIONS

Raagaard, M., et al, "Runtime Reconfiguration of Time-Sensitive Networking (TSN) Schedules for Fog Computing," 2017 IEEE Fog World Congress (FWC), IEEE, Oct. 30, 2017, 6 pages.
(Continued)

*Primary Examiner* — Abdelnabi O Musa
(74) *Attorney, Agent, or Firm* — Conley Rose, P.C.

(57) ABSTRACT

A packet forwarding method includes receiving N Time-Sensitive Networking (TSN) packet flows, where each of the N TSN packet flows corresponds to a constraint condition that defines duration of a cycle, a maximum quantity of packets that are allowed to be transmitted in the cycle, and a maximum length of a single packet, and forwarding the N TSN packet flows based on a new constraint condition, where the new constraint condition is based on the constraint condition corresponding to each of the N TSN packet flows and defines duration of a new cycle, a new maximum quantity of new packets that are allowed to be transmitted in the new cycle, and a new maximum length of a new packet, where each of the N TSN packet flows is forwarded in a case in which a corresponding constraint condition is complied with.

22 Claims, 15 Drawing Sheets

(51) Int. Cl.
*H04L 12/863* (2013.01)
*H04L 12/947* (2013.01)
*H04L 12/935* (2013.01)

(56) References Cited

U.S. PATENT DOCUMENTS

| | | | | |
|---|---|---|---|---|
| 2005/0226156 | A1* | 10/2005 | Keating | H04L 67/325 370/235 |
| 2008/0037567 | A1 | 2/2008 | Cho et al. | |
| 2014/0269480 | A1* | 9/2014 | Han | H04W 76/28 370/311 |
| 2016/0021017 | A1* | 1/2016 | Thubert | H04L 47/125 370/235 |
| 2016/0127250 | A1* | 5/2016 | McCormick | H04L 43/062 370/235 |
| 2017/0070439 | A1* | 3/2017 | Craciunas | H04L 12/413 |
| 2018/0160424 | A1* | 6/2018 | Cavalcanti | H04B 7/0408 |
| 2018/0184438 | A1* | 6/2018 | Cavalcanti | H04W 74/04 |

FOREIGN PATENT DOCUMENTS

| | | |
|---|---|---|
| CN | 101312530 A | 11/2008 |
| CN | 101790192 A | 7/2010 |
| CN | 101938341 A | 1/2011 |
| CN | 103561077 A | 2/2014 |
| KR | 20070064844 A | 6/2007 |

OTHER PUBLICATIONS

"IEEE Standard for Local and metropolitan area networks—Bridges and Bridged Networks, Amendment 25: Enhancements for Scheduled Traffic," IEEE Std 802.1Qbv, Dec. 5, 2015, 57 pages.

"IEEE Standard for Local and metropolitan area networks—Bridges and Bridged Networks, Amendment 29: Cyclic Queuing and Forwarding," IEEE Std 802.1Qch, May 18, 2017, 30 pages.

"IEEE Standard for Local and metropolitan area networks—Bridges and Bridged Networks," IEEE Std 802.1Q, Nov. 3, 2014, 1832 pages.

"Draft Standard for Local and Metropolitan Area Networks—Bridges and Bridged Networks—Amendment: Asynchronous Traffic Shaping," IEEE P802.1Qcr/D0.2, Oct. 20, 2017, 46 pages.

"IEEE Standard for Local and metropolitan area networks—Bridges and Bridged Networks—Amendment 28: Per-Stream Filtering and Policing," IEEE Std 802.1Qci, Feb. 14, 2017, 65 pages.

"P1722—revl/D15 Draft Standard for a Transport Protocol for Time-Sensitive Applications in Bridged Local Area Networks," Microprocessor Standards Committee of the IEEE Computer Society, Oct. 31, 2015, 249 pages.

Min, L., et al., "Research on Transmission QoS of Streaming Media Based on Delay Jitter," vol. 33, No. 5, Oct. 2009, Oct. 31, 2009, 5 pages.

* cited by examiner

TIME-SENSITIVE NETWORKING (TSN) PACKET FORWARDING

CROSS-REFERENCE TO RELATED APPLICATIONS

This application is a continuation of International Patent Application No. PCT/CN2017/109582 filed on Nov. 6, 2017, which is hereby incorporated by reference in its entirety.

TECHNICAL FIELD

This application relates to the field of data transmission, and in particular, to a packet forwarding method, a forwarding device, and a network device.

BACKGROUND

In recent years, the conventional Ethernet combines a quality of service (QoS) technology to provide a higher-efficiency and low-latency network service based on a best-effort forwarding mechanism. However, because burst and congestion in a network are unpredictable and inevitable, in the best-effort forwarding mechanism, there is still a probability that a forwarding latency is high or a packet loss occurs. Consequently, it is difficult to meet a requirement of transmission of some services (for example, transmission of a Time-Sensitive Networking (TSN) packet flow) that are sensitive to a latency and a packet loss.

In a typical example, because of transmission congestion, a TSN packet flow may not be received within a specific period of time, but intensively received within a next period of time by a forwarding device. Based on a scheduling policy, such as a first come first service (FCFS) in the best-effort forwarding mechanism, the forwarding device does not forward the TSN packet flow within a period of time, but intensively outputs the TSN packet flow within a next period of time. As a result, a transmission latency of the TSN packet flow is not uniform, jitter is quite high, and efficiency of forwarding a packet by a system is low.

SUMMARY

This application provides a packet forwarding method, a forwarding device, and a network device to help reduce jitter of a packet during forwarding, and improve resource utilization and forwarding efficiency of forwarding the packet by a system.

According to a first aspect, a packet forwarding method is provided, including receiving N TSN packet flows, where each of the N TSN packet flows corresponds to a constraint condition that defines duration of a single cycle, a maximum quantity of packets that are allowed to be transmitted in a single cycle, and a maximum length of a single packet, and N is a positive integer greater than or equal to 2, and forwarding the N TSN packet flows based on a new constraint condition that defines duration of a single cycle, a maximum quantity of packets that are allowed to be transmitted in a single cycle, and a maximum length of a single packet, where each TSN packet flow is forwarded in a case in which a corresponding constraint condition is complied with, and the new constraint condition is determined based on the constraint condition corresponding to each of the N TSN packet flows.

According to the packet forwarding method in the first aspect, a new constraint condition is configured in a scenario in which a plurality of TSN packet flows are forwarded such that each TSN packet flow is forwarded in a case in which a constraint condition corresponding to the TSN packet flow is complied with. This helps reduce jitter of a packet during forwarding, and can improve resource utilization and forwarding efficiency of forwarding the packet by a system.

In a possible implementation of the first aspect, a forwarding device may forward the N TSN packet flows as one new packet flow based on the new constraint condition. In this possible implementation, the N TSN packet flows are forwarded one new packet flow such that a next-hop forwarding device may not consider the N TSN packet flows, but performs forwarding processing on the new packet flow, thereby reducing processing difficulty of the next-hop forwarding device.

It should be understood that forwarding the N TSN packet flows as one new packet flow may be understood as forwarding the N TSN packet flows that are converged into one new packet flow.

In a possible implementation of the first aspect, the new packet flow carries a flow identifier (ID) of the new packet flow. In this possible implementation, the next-hop forwarding device may perform processing on the new packet flow more conveniently based on the flow ID of the packet flow.

In a possible implementation of the first aspect, the duration of a single cycle in the new constraint condition is a lowest common multiple (LCM) of the duration of a single cycle in the constraint conditions corresponding to the N TSN packet flows. In this possible implementation, the LCM of the duration of a single cycle in the constraint conditions corresponding to the N TSN packet flows is used as the duration of a single cycle in the new constraint condition such that in a single cycle in the new constraint condition, for each TSN packet flow, a packet corresponding to at least one cycle is sent, and a cycle for actually sending each TSN packet flow does not change.

In a possible implementation of the first aspect, forwarding the N TSN packet flows based on a new constraint condition that defines duration of a single cycle, a maximum quantity of packets that are allowed to be transmitted in a single cycle, and a maximum length of a single packet includes forwarding the N TSN packet flows based on the new constraint condition, where a first packet is sent at a start time of a cycle corresponding to the new constraint condition, and the first packet carries delimitation information used to indicate the start time of the cycle corresponding to the new constraint condition, and/or a second packet is sent at an end time of the cycle corresponding to the new constraint condition, and the second packet carries delimitation information used to indicate the end time of the cycle corresponding to the new constraint condition. In this possible implementation, in a clock asynchronization network, the delimitation information is added to a packet in each cycle when the new packet flow is sent such that the next-hop device identifies a boundary of the cycle.

In a possible implementation of the first aspect, the cycle corresponding to the new constraint condition includes a security center time segment and a guard interval time segment, and a packet in the N TSN packet flows is forwarded in the security center time segment. In this possible implementation, in a clock synchronization network, the guard interval time segment is set in the cycle corresponding to the new constraint condition, to prevent a boundary identification error when the next-hop device identifies the cycle.

It should be understood that none of the N TSN packet flows is forwarded in the guard interval time segment.

In a possible implementation of the first aspect, before forwarding the N TSN packet flows based on a new constraint condition that defines duration of a single cycle, a maximum quantity of packets that are allowed to be transmitted in a single cycle, and a maximum length of a single packet, the method further includes receiving information that is used to indicate the new constraint condition and that is sent by a network configuration device, and determining the new constraint condition based on the information used to indicate the new constraint condition. In this possible implementation, the new constraint condition is determined by the network configuration device.

In a possible implementation of the first aspect, before forwarding the N TSN packet flows based on the new constraint condition that defines the cycle length, the maximum quantity of packets that are allowed to be transmitted in a single cycle, and the maximum length of a single packet, the forwarding device may further obtain the constraint condition corresponding to each of the N TSN packet flows, and determine the new constraint condition based on a constraint condition corresponding to each of the N TSN packet flows. In this possible implementation, the new constraint condition is determined by the forwarding device.

In a possible implementation of the first aspect, forwarding the N TSN packet flows based on a new constraint condition that defines duration of a single cycle, a maximum quantity of packets that are allowed to be transmitted in a single cycle, and a maximum length of a single packet includes respectively storing the N TSN packet flows in N cache queues, where the N TSN packet flows are in a one-to-one correspondence with the N cache queues, and each cache queue has a gating control switch that controls packet output, and controlling output of packets in the N cache queues by controlling the gating control switch based on a gating control list corresponding to the new constraint condition.

In a possible implementation of the first aspect, forwarding the N TSN packet flows based on a new constraint condition that defines duration of a single cycle, a maximum quantity of packets that are allowed to be transmitted in a single cycle, and a maximum length of a single packet includes respectively storing the N TSN packet flows in N cache queues, where the N TSN packet flows are in a one-to-one correspondence with the N cache queues, and forwarding, based on a time slice forwarding table, the N TSN packet flows stored in the N cache queues.

In a possible implementation of the first aspect, forwarding the N TSN packet flows based on a new constraint condition that defines duration of a single cycle, a maximum quantity of packets that are allowed to be transmitted in a single cycle, and a maximum length of a single packet includes extracting a corresponding packet from the N TSN packet flows based on the new constraint condition, and storing the packet in a first cache queue, where the packet in the first cache queue is a packet in a cycle in the new constraint condition, and outputting the packet in the first cache queue at a corresponding moment.

In a possible implementation of the first aspect, the N TSN packet flows include a first TSN packet flow and a second TSN packet flow, a constraint condition corresponding to the first TSN packet flow is different from a constraint condition corresponding to the second TSN packet flow. To be specific, this possible implementation is more applicable to a case in which at least two TSN packet flows with different constraint conditions exist in the N TSN packet flows.

According to a second aspect, a packet forwarding method is provided, including obtaining a constraint condition that corresponds to each of N TSN packet flows and that defines duration of a single cycle, a maximum quantity of packets that are allowed to be transmitted in a single cycle, and a maximum length of a single packet, where N is a positive integer greater than or equal to 2, and determining, based on the constraint condition of each of the N TSN packet flows, a new constraint condition that defines duration of a single cycle, a maximum quantity of packets that are allowed to be transmitted in a single cycle, and a maximum length of a single packet, where when the new constraint condition is used by a forwarding device to forward the N TSN packet flows, each TSN packet flow is forwarded in a case in which a corresponding constraint condition is complied with.

According to the packet forwarding method in the second aspect, a new constraint condition is configured in a scenario in which a plurality of TSN packet flows are forwarded such that each TSN packet flow is forwarded in a case in which a constraint condition corresponding to the TSN packet flow is complied with. This helps reduce jitter of a packet during forwarding, and can improve resource utilization and forwarding efficiency of forwarding the packet by a system.

In a possible implementation of the second aspect, the forwarding device may forward the N TSN packet flows as one new packet flow based on the new constraint condition.

It should be understood that forwarding the N TSN packet flows as one new packet flow may be understood as forwarding the N TSN packet flows that are converged into one new packet flow.

In a possible implementation of the second aspect, the new packet flow carries a flow ID of the new packet flow.

In a possible implementation of the second aspect, the duration of a single cycle in the new constraint condition is an LCM of the duration of a single cycle in the constraint conditions corresponding to the N TSN packet flows.

In a possible implementation of the second aspect, the new constraint condition defines that a first packet is sent at a start time of a cycle corresponding to the new constraint condition, and the first packet carries delimitation information used to indicate the start time of the cycle corresponding to the new constraint condition, and/or a second packet is sent at an end time of the cycle corresponding to the new constraint condition, and the second packet carries delimitation information used to indicate the end time of the cycle corresponding to the new constraint condition.

In a possible implementation of the second aspect, the cycle corresponding to the new constraint condition includes a security center time segment and a guard interval time segment, and a packet in the N TSN packet flows is forwarded in the security center time segment.

It should be understood that none of the N TSN packet flows is forwarded in the guard interval time segment.

In a possible implementation of the second aspect, the N TSN packet flows are respectively stored in N cache queues, output of packets in the N cache queues is controlled by controlling a gating control switch based on a gating control list corresponding to the new constraint condition, and the N TSN packet flows are in a one-to-one correspondence with the N cache queues, and each cache queue has the gating control switch that controls packet output.

In a possible implementation of the second aspect, the N TSN packet flows are respectively stored in N cache queues, where the N TSN packet flows are in a one-to-one correspondence with the N cache queues, and the N TSN packet flows in the N cache queues are forwarded based on a time slice forwarding table.

In a possible implementation of the second aspect, the method further includes sending, to the forwarding device, information used to indicate the new constraint condition.

In a possible implementation of the second aspect, the method further includes receiving the N TSN packet flows, and forwarding the N TSN packet flows based on the new constraint condition, where each TSN packet flow is forwarded in a case in which a corresponding constraint condition is complied with.

According to a third aspect, a forwarding device is provided, where the forwarding device includes a module configured to perform any one of the first aspect or the possible implementations of the first aspect.

According to a fourth aspect, a network device is provided, where the network device includes a module configured to perform any one of the second aspect or the possible implementations of the second aspect.

According to a fifth aspect, a forwarding device is provided, where the forwarding device may include a processor and a memory, the memory is configured to store an instruction, and when the processor executes the instruction stored in the memory, the forwarding device is enabled to perform the method according to any one of the first aspect or the possible implementations of the first aspect.

According to a sixth aspect, a network device is provided, where the network device may include a processor and a memory, the memory is configured to store an instruction, and when the processor executes the instruction stored in the memory, the network device is enabled to perform the method according to any one of the second aspect or the possible implementations of the second aspect.

According to a seventh aspect, a computer storage medium is provided, where the computer storage medium stores an instruction, and when the instruction runs on a computing device, the computing device is enabled to perform the method according to any one of the first aspect or the possible implementations of the first aspect.

According to an eighth aspect, a computer storage medium is provided, where the computer storage medium stores an instruction, and when the instruction runs on a computing device, the computing device is enabled to perform the method according to any one of the second aspect or the possible implementations of the second aspect.

According to a ninth aspect, a computer application program is provided, where the computer application program includes an instruction, and when the instruction runs on a computing device, the computing device is enabled to perform the method according to any one of the first aspect or the possible implementations of the first aspect.

According to a tenth aspect, a computer application program is provided, where the computer application program includes an instruction, and when the instruction runs on a computing device, the computing device is enabled to perform the method according to any one of the second aspect or the possible implementations of the second aspect.

DESCRIPTION OF EMBODIMENTS

Figure 1:
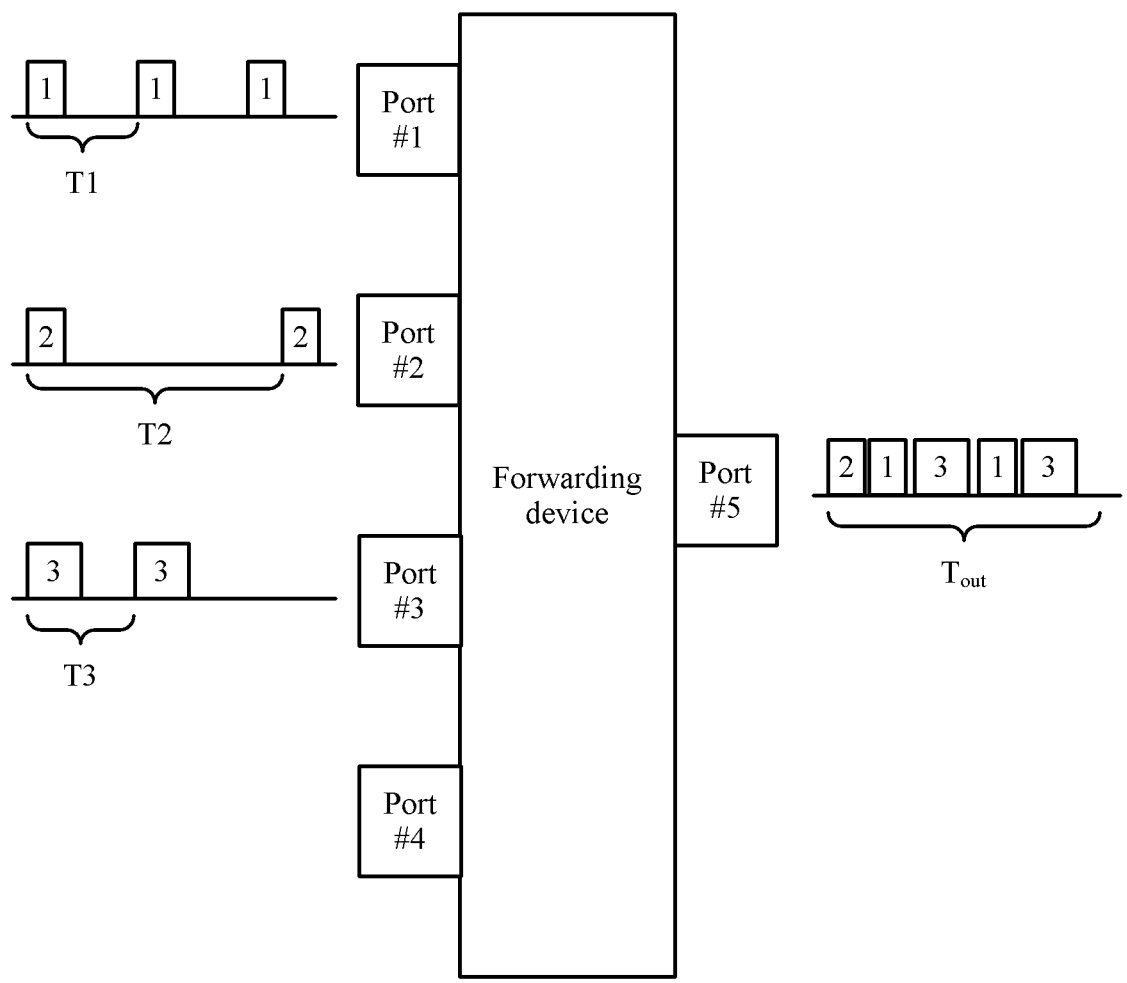
FIG. 1 is a schematic diagram of a packet forwarding method according to an embodiment of this application.

The following describes technical solutions of this application with reference to the accompanying drawings.

TSN in this application may be a standard defined by the Task Group of the Institute of Electrical and Electronics Engineers (IEEE). For example, the TSN may be IEEE 802.1ASbt or IEEE 802.1Qcc. A TSN packet flow may be a packet flow that complies with the TSN. Different TSN packet flows may have different characteristics. For example, a 5-tuple of a TSN packet flow 1 is different from a 5-tuple of a TSN packet flow 2. The 5-tuple may include a source Internet Protocol (IP) address, a destination IP address, a source port, a destination port, and a protocol. For another example, a constraint condition of the TSN packet flow 1 is different from a constraint condition of the TSN packet flow 2. A constraint condition may include duration of a single cycle, a maximum length of a single packet, and a maximum quantity of packets that are allowed to be transmitted in a single cycle. For the constraint condition, reference may be made to the following description.

An embodiment of this application provides a packet forwarding method. The packet forwarding method may be performed by a forwarding device. The forwarding device may use a packet switching architecture. The packet forwarding method may include receiving N TSN packet flows, where each of the N TSN packet flows corresponds to a constraint condition that defines duration of a single cycle, a maximum quantity of packets that are allowed to be transmitted in a single cycle, and a maximum length of a single packet, and N is a positive integer greater than or equal to 2, and forwarding the N TSN packet flows based on a new constraint condition that defines duration of a single cycle, a maximum quantity of packets that are allowed to be transmitted in a single cycle, and a maximum length of a single packet, where each TSN packet flow is forwarded in a case in which a corresponding constraint condition is complied with, and the new constraint condition is determined based on the constraint condition corresponding to each of the N TSN packet flows.

According to the packet forwarding method in this embodiment of this application, a new constraint condition is configured in a scenario in which a plurality of TSN packet flows are forwarded such that each TSN packet flow is forwarded in a case in which a constraint condition corresponding to the TSN packet flow is complied with. This helps reduce jitter of a packet during forwarding, and can improve resource utilization and forwarding efficiency of forwarding the packet by a system.

It should be understood that a constraint condition in the embodiments of this application may include duration of a single cycle, a maximum length of a single packet, and a maximum quantity of packets that are allowed to be transmitted in a single cycle. The duration of a single cycle may be corresponding to a term MeasurementInterval in the standard, which is also referred to as a measurement interval. The maximum length of a single packet may be corresponding to a term MaxFrameSize in the standard. The maximum quantity of packets that are allowed to be transmitted in a single cycle may be corresponding to a term MaxIntervalFrame in the standard.

For MeasurementInterval, MaxFrameSize, and MaxIntervalFrame, reference is made to a standard related to Audio Video Bridging (AVB). The standard may be a standard released by the IEEE 802.1 AVB task group, for example, 802.1ba, 802.1as, 802.1at, or 802.1av.

It should also be understood that, in the embodiments of this application, the duration of a single cycle may be represented by time, for example, a nanosecond, a microsecond, or a millisecond. The duration of a single cycle, in combination with a bandwidth, may be represented by a data volume, for example, a bit or a byte. This is not limited in the embodiments of this application.

Input or output of the TSN packet flow at each port of the forwarding device follows a periodic rule, and the constraint condition is a parameter used to indicate the periodic rule. To be specific, the TSN packet flow is cyclically input into the forwarding device based on a specific cycle, and a data volume in each cycle has an upper limit. However, the embodiments of this application are not merely applicable to a packet flow with a strict constant bit rate (CBR). If there is a specific fluctuation in the packet flow, the forwarding device needs to perform configuration and forwarding reservation based on the upper limit of the data volume sent in a single cycle. During a packet forwarding process, if a quantity of received TSN packets is sufficient, a packet may be scheduled from a packet queue with a low priority to avoid bandwidth waste.

In addition to the foregoing three parameters, the new constraint condition in the embodiments of this application may include a parameter that reflects a hierarchical relationship or a nested relationship between the cycle in the new constraint condition and the cycle of the N TSN packet flows. This is not limited in the embodiments of this application. In addition, the constraint condition in the embodiments of this application may include another parameter, and this is not limited in the embodiments of this application.

FIG. 1 is a schematic diagram of a packet forwarding method according to an embodiment of this application. A forwarding device has M input ports. For example, FIG. 1 shows four input ports: a port #1, a port #2, a port #3, and a port #4. N input ports in the M input ports are configured to receive N TSN packet flows. The N input ports are in a one-to-one correspondence with the N TSN packet flows. In the schematic diagram provided in FIG. 1, N is equal to 3. Further, the port #1, the port #2, and the port #3 are configured to receive TSN packet flows. For example, the TSN packet flows received on the port #1, the port #2, and the port #3 are a packet flow #1, a packet flow #2, and a packet flow #3, respectively. Each TSN packet flow (the packet flow #1, the packet flow #2, and the packet flow #3) corresponds to a constraint condition. For example, duration of a single cycle of the packet flow #1 is T1, and a constraint condition of the packet flow #1 further includes a maximum length of a single packet and a maximum quantity of packets that are allowed to be transmitted in a single cycle. Duration of a single cycle of the packet flow #2 is T2, and a constraint condition of the packet flow #2 further includes a maximum length of a single packet and a maximum quantity of packets that are allowed to be transmitted in a single cycle. Duration of a single cycle of the packet flow #3 is T3, and a constraint condition of the packet flow #3 further includes a maximum length of a single packet and a maximum quantity of packets that are allowed to be transmitted in a single cycle.

In this embodiment of this application, any two TSN packet flows in the N TSN packet flows may have a same constraint condition, or may have different constraint conditions. When any two TSN packet flows have different constraint conditions, three parameters in the constraint conditions may be completely different or may be partially different. To be specific, the N TSN packet flows include a first TSN packet flow and a second TSN packet flow, and a constraint condition corresponding to the first TSN packet flow may be different from a constraint condition corresponding to the second TSN packet flow. For example, duration of a single cycle of the first TSN packet flow is different from duration of a single cycle of the second TSN packet flow. Alternatively, duration of a single cycle of the first TSN packet flow is equal to duration of a single cycle of the second TSN packet flow, and a maximum quantity of packets that are allowed to be transmitted in a single cycle of the first TSN packet flow is different from a maximum quantity of packets that are allowed to be transmitted in a single cycle of the second TSN packet flow.

The forwarding device has at least one output port, which is configured to forward a received packet flow. For example, the output port may be a port #5 in FIG. 1. The forwarding device may forward the N TSN packet flows as one new packet flow based on a new constraint condition. In this embodiment of this application, when the N TSN packet flows are forwarded as one new packet flow, the N TSN packet flows may be converged into one new packet flow, and the new packet flow is forwarded. The new packet flow corresponds to the new constraint condition. The new constraint condition includes duration of a single cycle (for example, $T_{out}$ in FIG. 1). In addition, the new constraint condition includes a maximum length of a single packet and a maximum quantity of packets that are allowed to be transmitted in a single cycle. When the forwarding device forwards the N TSN packet flows based on the new constraint condition, each TSN packet flow is forwarded in a case in which a corresponding constraint condition is complied with. That is, the packet flow #1, the packet flow #2, and the packet flow #3 still respectively comply with respective constraint conditions.

The TSN packet flow may carry a flow ID. For example, the packet flow #1 carries a flow ID #1, the packet flow #2 carries a flow ID #2, and the packet flow #3 carries a flow ID #3. In this embodiment of this application, the forwarding device may add an ID of the new packet flow to the new packet flow that is obtained by converging the N TSN packet flows. That is, each packet in the new packet flow may carry the ID of the new packet flow. In this way, when the forwarding device forwards the new packet flow to a next-hop device, the next-hop device may process a received packet based on the ID of the new packet flow carried in the received packet. To be specific, the next-hop device may consider a packet in the packet flow #1, a packet in the packet flow #2, and a packet in the packet flow #3 as packets in a same packet flow based on the ID of the new packet flow carried in the packet. Assuming that the new packet flow does not carry the ID of the new packet flow, the next-hop device may consider the packet in the packet flow #1 and the packet in the packet flow #2 as packets in different packet flows, and perform a related operation on the new packet flow, for example, configure a gating control list or a time slice forwarding table to forward the new packet flow. The gating control list and the time slice forwarding table are described in detail below. Certainly, in this embodiment of this application, the forwarding device may alternatively not add the ID of the new packet flow to the new packet flow, especially in a case in which all forwarding devices in a network are clock synchronized.

Optionally, the new constraint condition may be determined by the forwarding device. For example, before forwarding the N TSN packet flows based on the new constraint condition that defines the duration of a single cycle, the maximum quantity of packets that are allowed to be transmitted in a single cycle, and the maximum length of a single packet, the forwarding device may further obtain the constraint condition corresponding to each of the N TSN packet flows, and determine the new constraint condition based on the constraint condition corresponding to each of the N TSN packet flows.

After determining the new constraint condition, the forwarding device may notify the next-hop forwarding device of the determined new constraint condition in order to ensure consistent configurations of a receive end and a transmit end. Further, for example, after determining the new constraint condition, the forwarding device notifies the next-hop forwarding device of the duration of a single cycle, the maximum quantity of packets that are allowed to be transmitted in a single cycle, the maximum length of a single packet, and the like that are in the new constraint condition such that the next-hop forwarding device performs parsing, other processing, or the like based on a corresponding parameter. This is not limited in this embodiment of this application.

Optionally, the new constraint condition may be determined by a network configuration device. For example, before forwarding the N TSN packet flows based on the new constraint condition that defines the duration of a single cycle, the maximum quantity of packets that are allowed to be transmitted in a single cycle, and the maximum length of a single packet, the forwarding device may further receive information that is used to indicate the new constraint condition and that is sent by the network configuration device, and determine the new constraint condition based on the information used to indicate the new constraint condition. Correspondingly, the network configuration device sends, to the forwarding device, the information used to indicate the new constraint condition.

It should be understood that after obtaining the new constraint condition through calculation, the network configuration device may notify a receive end and a transmit end in at least one link of the calculated new constraint condition in order to ensure consistent configurations of the receive end and the transmit end. Further, for example, after determining the new constraint condition, the network configuration device notifies the forwarding device and the corresponding next-hop forwarding device of the duration of a single cycle, the maximum quantity of packets that are allowed to be transmitted in a single cycle, the maximum length of a single packet, and the like that are in the new constraint condition such that the forwarding device performs sending based on a corresponding parameter, and the next-hop forwarding device performs parsing, other processing, or the like based on a corresponding parameter. This is not limited in this embodiment of this application.

It should also be understood that determining the new constraint condition by the forwarding device or the network configuration device may be performed during data link establishment and before the packet flow starts to be sent. Further, before the packet flow is forwarded, a data link used to transmit the packet flow needs to be established in the network. The data link may include one or more forwarding devices. During the data link establishment, the forwarding device in the data link may obtain a constraint condition of a packet flow that needs to be forwarded by the forwarding device, to determine a new constraint condition, or the network configuration device corresponding to the data link obtains a constraint condition of each packet flow, to determine a new constraint condition that needs to be complied with when the forwarding device in the data link used to transmit the packet flow performs forwarding.

As described above, the constraint condition includes at least three parameters. The three parameters corresponding to the new constraint condition should be set to enable each TSN packet flow to comply with a constraint condition of the TSN packet flow. For the duration of a single cycle in the new constraint condition, obviously, on a same output port, if all TSN packet flows still comply with respective original constraint conditions, a cycle corresponding to a high-rate packet flow in the TSN packet flow is short, and a cycle corresponding to a low-rate packet flow is long. When the output port carries packet flows at different rates, the forwarding device or the network configuration device may set a combination cycle to meet a requirement for simultaneously transmitting packet flows at different rates. The combination cycle supports a hierarchical design, that is, a long cycle includes a plurality of short cycles, and may use different symbols (for example, only the flow ID of the packet flow may be used) to identify locations of short cycles of different packet flows. For example, in Table 1 below, the flow ID is used to identify a location, in a long cycle, of a short cycle of each packet flow.

In a specific example, duration of a single cycle of an output port (duration of a long cycle) may be an LCM of the duration of a single cycle of the N TSN packet flows, that is, $T_{out}$=LCM (T1, T2, . . . , TN). That is, the duration of a single cycle in the new constraint condition is the LCM of the duration of a single cycle in constraint conditions corresponding to N TSN packet flows.

Figure 2:
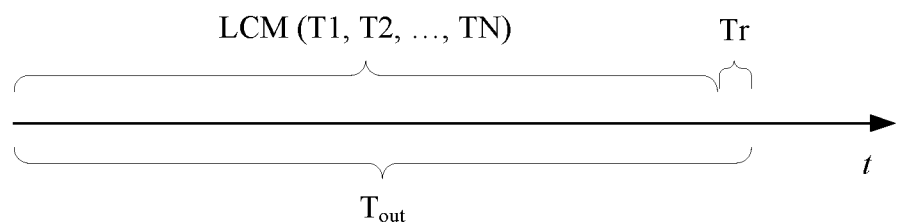
FIG. 2 is a schematic diagram of a cycle length of an output port according to an embodiment of this application.

It should be understood that, generally, a minimum time unit corresponding to a cycle of an output port of a forwarding device is the minimum time unit that can be forwarded and processed by the forwarding device, that is, duration of a single cycle of the output port of the forwarding device is an integer multiple of the minimum time unit that can be forwarded and processed by the forwarding device. Therefore, when the forwarding device or a network configuration device determines duration of a single cycle in a new constraint condition, there may be a case in which an LCM cannot be used as the duration of a single cycle of the output port because the minimum time unit that can be forwarded and processed by the forwarding device needs to be considered. In this case, the forwarding device or the network configuration device may set the duration of a single cycle of the output port to the LCM plus an adaptation value Tr. For example, FIG. 2 is a schematic diagram of duration of a single cycle of an output port according to an embodiment of this application. As shown in FIG. 2, the duration of a single cycle of the output port is $T_{out}$=LCM (T1, T2, ..., TN)+Tr.

Duration of a single cycle in the new constraint condition in this embodiment of this application may be greater than or equal to a maximum value of duration of a single cycle of an input port of all TSN packet flows. That is, a design of the duration of a single cycle in the new constraint condition can enable a packet of each TSN packet flow to be sent at least once in a cycle. However, this is not limited in this embodiment of this application.

A maximum quantity of packets that are allowed to be transmitted in a single cycle in the new constraint condition may be greater than or equal to a sum of maximum quantities of packets that are allowed to be transmitted in a single cycle of all TSN packet flows. A packet that is transmitted in a single cycle and that is of each of N TSN packet flows may be sent in a single cycle in the new constraint condition. A maximum length of a single packet in the new constraint condition may be equal to a maximum value among maximum lengths of single packets of all the TSN packet flows. For example, it is assumed that a maximum length of a single packet of a packet flow #1 is L1, a maximum length of a single packet of a packet flow #2 is L2, and a maximum length of a single packet of a packet flow #3 is L3, where L1 is greater than L2, and L2 is greater than L3. In this case, the maximum length of a single packet in the new constraint condition may be equal to L1. However, values of parameters such as the duration of a single cycle, the maximum quantity of packets that are allowed to be transmitted in a single cycle, and the maximum length of a single packet in the new constraint condition are not limited in this embodiment of this application.

In addition to the foregoing configuration, the forwarding device distinguishes between packet blocks in packet flows by identifying a boundary of a cycle, and stores the packet blocks in corresponding cache queues such that the packet blocks wait for forwarding. Boundary identification of the cycle is classified into two cases device clock synchronization in a network and device clock asynchronization in the network.

In the clock asynchronization network, when sending a packet flow, each device may generally define the boundary of the cycle by adding delimitation information or another piece of out-of-band information to a packet in each cycle, or in another manner such that a next-hop device identifies the boundary of the cycle. It should be understood that the delimitation information may be carried in the TSN packet flow, for example, the delimitation information may be sent at a start time, an end time, or another agreed time in the cycle. The delimitation information may be carried in a dedicated delimitation packet, and the delimitation packet is sent at the start time, the end time, or the other agreed time in the cycle. The dedicated delimitation packet does not belong to any TSN packet flow in the N TSN packet flows. In addition, the dedicated delimitation packet may be between two cycles, and may not belong to any cycle. For the clock asynchronization network, additional delimitation information is required, but a relatively small quantity of time resources is wasted and configuration is relatively simple. Certainly, the boundary of the cycle may alternatively be determined in another manner in the clock asynchronization network. This is not limited in this embodiment of this application.

In a specific example, forwarding the N TSN packet flows based on the new constraint condition that defines duration of a single cycle, a maximum quantity of packets that are allowed to be transmitted in a single cycle, and a maximum length of a single packet may include forwarding the N TSN packet flows based on the new constraint condition, where a first packet is sent at a start time of a cycle corresponding to the new constraint condition, and the first packet carries delimitation information used to indicate the start time of the cycle corresponding to the new constraint condition, and/or a second packet is sent at an end time of the cycle corresponding to the new constraint condition, and the second packet carries delimitation information used to indicate the end time of the cycle corresponding to the new constraint condition.

Figure 3:
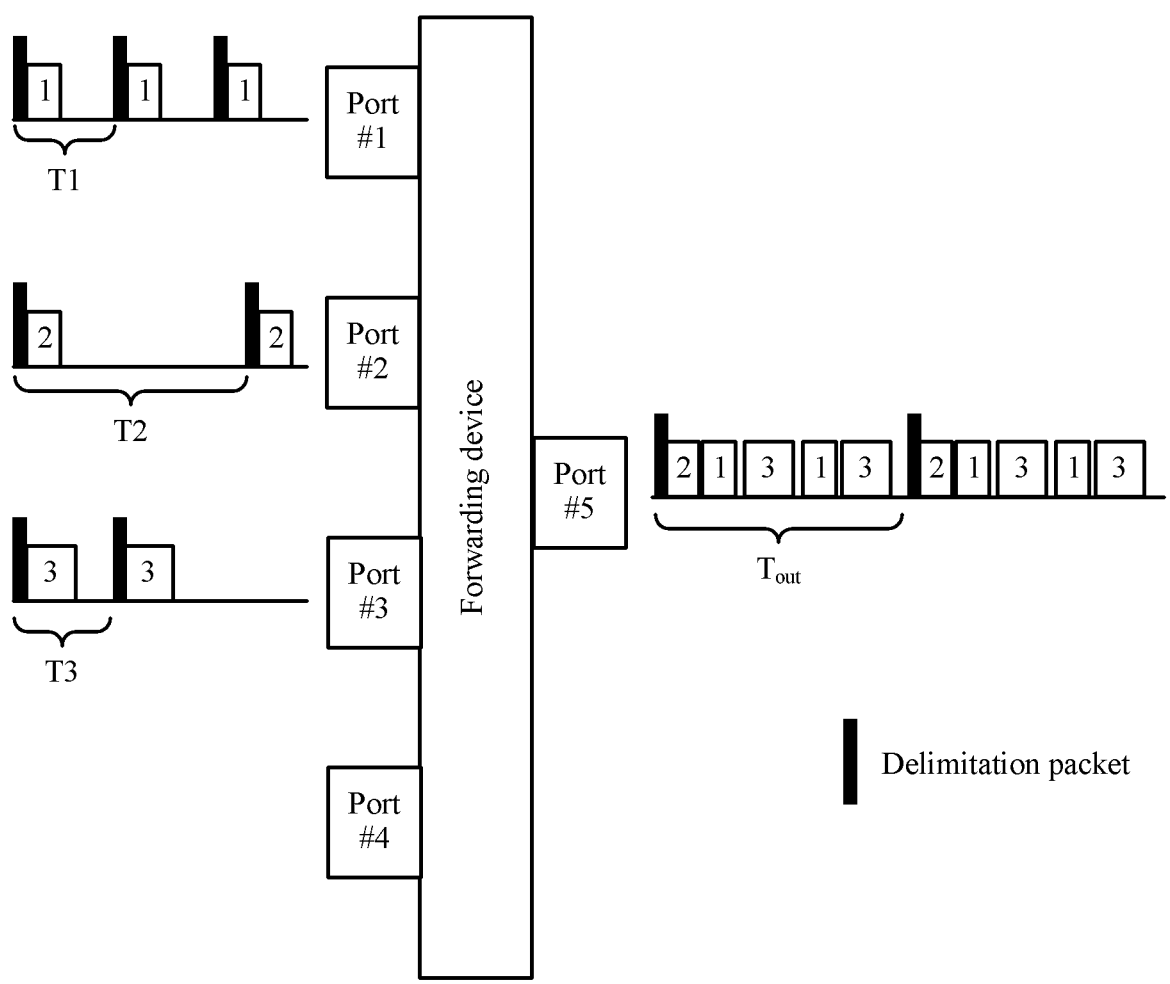
FIG. 3 is a schematic diagram of a delimitation packet according to an embodiment of this application.

FIG. 3 is a schematic diagram of a delimitation packet according to an embodiment of this application. As shown in FIG. 3, a port #1, a port #2, and a port #3 respectively receive a packet flow #1, a packet flow #2, and a packet flow #3. The packet flow #1, the packet flow #2, and the packet flow #3 all carry a delimitation packet at start times of respective cycles. These delimitation packets may be added by a previous-hop device, that is, a device sending the packet flow #1, the packet flow #2, and the packet flow #3. A new packet flow sent by a port #5 also carries a delimitation packet at a start time of a cycle, and the delimitation packet may be added by a forwarding device shown in FIG. 3.

In a clock synchronization network, clock configurations of devices in the network are the same (or at least the clock configurations of the devices are expected to be the same). Therefore, the forwarding device may determine a boundary of a cycle using a clock of the forwarding device (time indicated by a clock of another device in another network is the same as or at least similar to time indicated by the clock of the forwarding device). Clock precision of forwarding devices in the network may be different, and a relative leftward or rightward drift may occur. This causes a specified range of jitter in a boundary part of the cycle, and a TSN packet cannot be sent at a time within the jitter range. When a TSN packet is sent at the time within the jitter range, the boundary of the cycle may be inaccurately determined, and consequently an error may occur when some forwarding devices perform scheduling. According to the method in this embodiment of this application, a specific guard interval time segment is set in the cycle to prevent a boundary identification error and a scheduling error that may be caused by insufficient clock precision. In this embodiment of this application, the TSN packet is sent only in a security center time segment of each cycle, and the TSN packet is not sent in a guard interval time segment of each cycle, for example, a packet is not sent or only a non-TSN packet is sent in the guard interval time segment. The non-TSN packet may be a packet of a background (BG) flow, or may be another packet with a lower priority. This is not limited in this embodiment of this application. In conclusion, for the clock synchronization network, a specific guard interval time segment needs to be reserved. This results in a waste of some additional resources.

In a specific example, a cycle corresponding to a new constraint condition includes a security center time segment and a guard interval time segment, and a packet in N TSN packet flows is forwarded in the security center time segment. None of the N TSN packets is forwarded in the guard interval time segment. To be specific, in this embodiment of this application, the forwarding the N TSN packet flows based on a new constraint condition that defines duration of a single cycle, a maximum quantity of packets that are allowed to be transmitted in a single cycle, and a maximum length of a single packet may include forwarding the N TSN packet flows based on the new constraint condition, where each cycle corresponding to the new constraint condition includes a security center time segment and a guard interval time segment, and the TSN packet is sent in the security center time segment of each cycle corresponding to the new constraint condition but is not sent in the guard interval time segment of each cycle corresponding to the new constraint condition.

Figure 4:
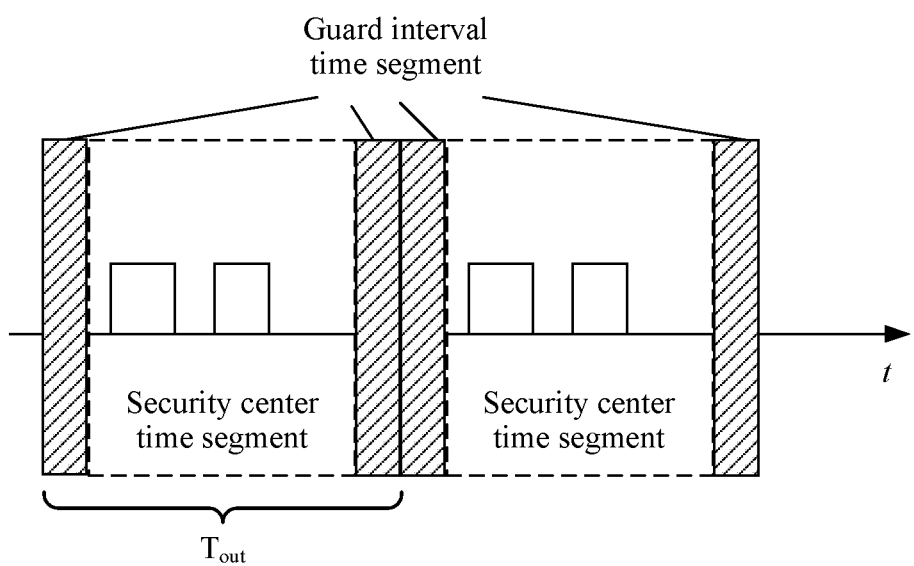
FIG. 4 is a schematic diagram of a cycle according to an embodiment of this application.

FIG. 4 is a schematic diagram of two adjacent cycles according to an embodiment of this application. As shown in FIG. 4, a cycle length corresponding to a new constraint condition is $T_{out}$, and a cycle includes a security center time segment and a guard interval time segment. The guard interval time segment can prevent various cases such as clock widening, clock narrowing, left drifting, and right drifting. Certainly, a device in a clock synchronization network may set delimitation information at a boundary of a cycle of a TSN packet flow such that a forwarding device that receives the TSN packet flow can accurately identify the boundary of the cycle. In this case, no guard interval time segment may be set at the boundary of the cycle, but this is not limited in this embodiment of this application.

After the TSN packet flow enters the forwarding device from an input port, the forwarding device caches the packet, and then outputs the packet from an output port based on the new constraint condition. Further, the forwarding device may store the packet flow in at least one cache queue after identifying the packet flow based on a constraint condition corresponding to the received packet flow and/or a flow ID of the packet flow. There is a plurality of cache queue allocation manners. For example, the cache queue may be allocated based on the flow ID of the packet flow, the cache queue may be allocated based on a cycle (for example, a cycle ID) of the output port, or the cache queue may be allocated based on a combination of the flow ID and the cycle ID. The following separately describes the three cases in detail. In this embodiment of this application, the cache queue may alternatively be allocated based on another condition, and this is not limited in this embodiment of this application. Different cache queue allocation manners are different in latency interference between packet flows and implementation difficulty. In specific implementation, the cache queue allocation manner may be determined by the forwarding device or a network configuration device depending on a specific case.

Figure 5:
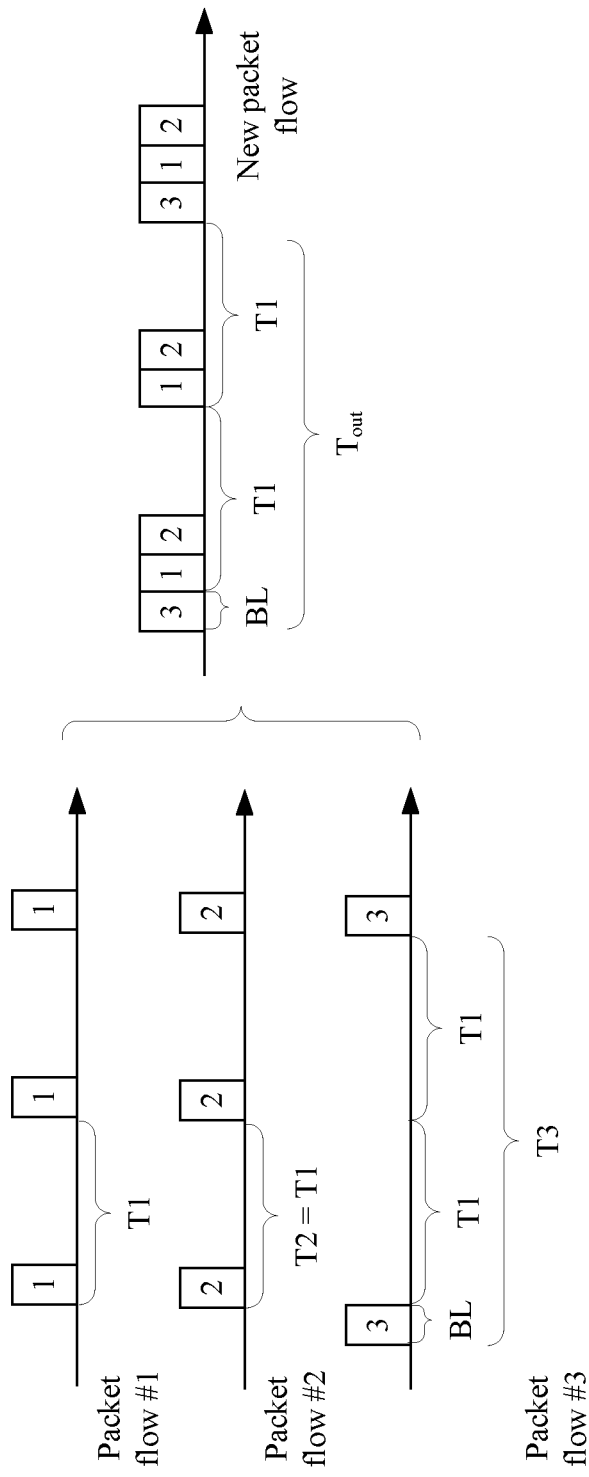
FIG. 5 is a schematic diagram of receiving and forwarding a packet flow by a forwarding device according to an embodiment of this application.

FIG. 5 is a schematic diagram of receiving and forwarding a packet flow by a forwarding device according to an embodiment of this application. In an example shown in FIG. 5, the forwarding device receives three TSN packet flows a packet flow #1 (a flow ID is flow 1), a packet flow #2 (a flow ID is flow 2), and a packet flow #3 (a flow ID is flow 3). Duration of a single cycle of the packet flow #1 is T1, duration of a single cycle of the packet flow #2 is T2, where T2=T1, and duration of a single cycle of the packet flow #3 is T3, and is twice the duration of a single cycle of the packet flow #1 plus a burst length (BL) of the packet flow #3, where the BL corresponds to a maximum length of a single packet of the packet flow #3. As shown in FIG. 5, under a new constraint condition, the forwarding device converges the packet flow #1, the packet flow #2, and the packet flow #3 into one new packet flow for forwarding. A cycle length $T_{out}$ of the new packet flow is equal to T3.

Figure 6:
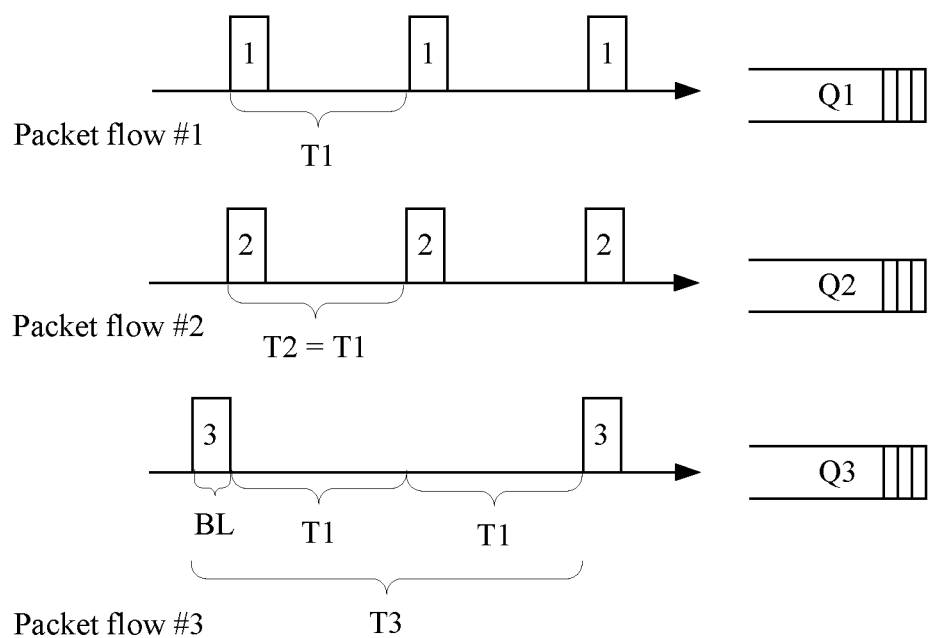
FIG. 6 is a schematic diagram of a packet caching solution according to an embodiment of this application.

After entering a forwarding device, a packet flow may enter at least one cache queue based on the different allocation manners described above. In a caching solution, the forwarding device respectively stores N TSN packet flows in N cache queues, and the N TSN packet flows are in a one-to-one correspondence with the N cache queues. FIG. 6 is a schematic diagram of a packet caching solution according to an embodiment of this application. As shown in FIG. 6, in this solution, the forwarding device allocates a cache queue based on a flow ID. A packet flow #1 whose flow ID is flow 1 enters a cache queue Q1, a packet flow #2 whose flow ID is flow 2 enters a cache queue Q2, and a packet flow #3 whose flow ID is flow 3 enters a cache queue Q3.

Figure 7:
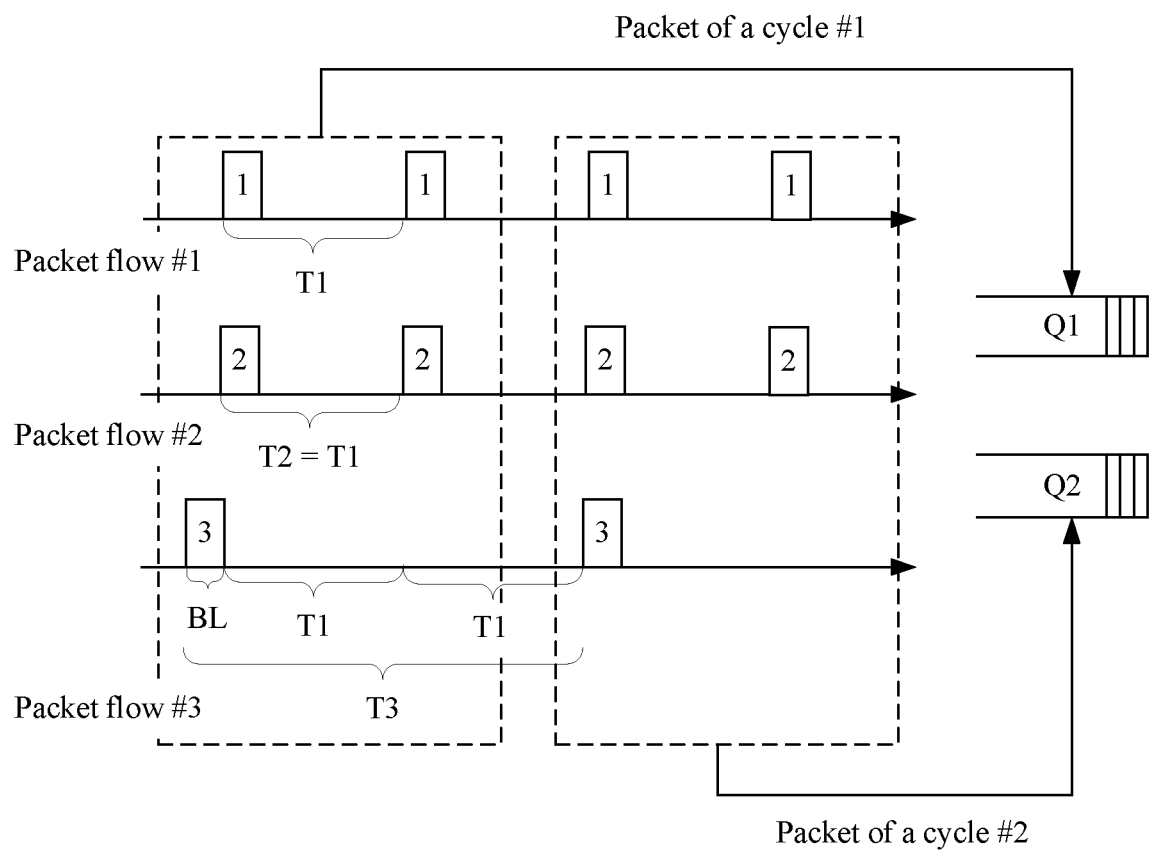
FIG. 7 is a schematic diagram of a packet caching solution according to another embodiment of this application.

In another caching solution, data of a plurality of cycles may be cached inside a forwarding device. The forwarding device forms a cache queue for N TSN packet flows based on a cycle of sending a packet from an output port. Packets of a plurality of packet flows in a same output cycle may be stored in one cache queue. The packets in one cycle in the cache queue may be in a preset order. The order of the packets in one cycle in the cache queue is not limited in this application. FIG. 7 is a schematic diagram of a packet caching solution according to another embodiment of this application. As shown in FIG. 7, in this solution, the forwarding device allocates the cache queue based on a cycle ID. A packet (for example, a packet in a left dashed-line box in FIG. 7) with a cycle #1 enters a cache queue Q1, and a packet (for example, a packet in a right dashed-line box in FIG. 7) with a cycle #2 enters a cache queue Q2. It should be noted that a quantity M of cache queues of the forwarding device may be determined by an internal latency (Internal Delay) for device forwarding and a cycle length of a new packet flow (New MeasurementInterval), for example, M=Internal Latency/New MeasurementInterval+1. The internal latency for device forwarding means a latency caused by a specific time required for performing related processing when the forwarding device performs forwarding, and is a latency related to a forwarding capability of the forwarding device.

Figure 8:
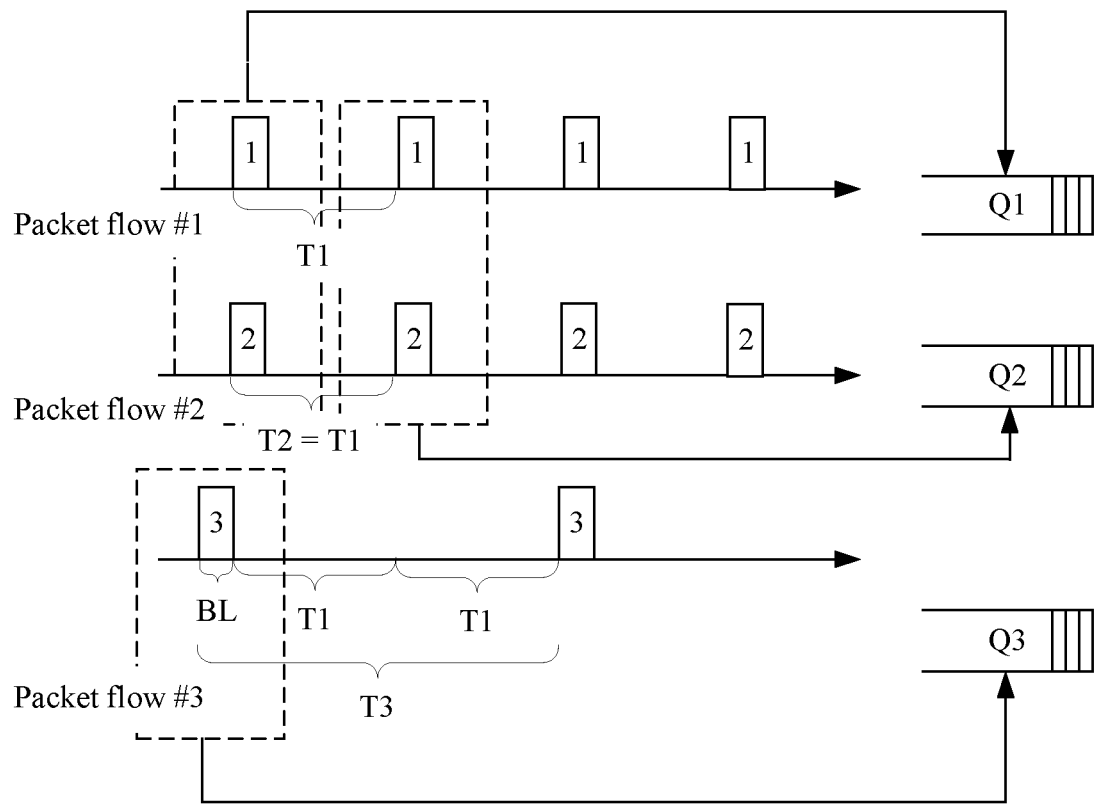
FIG. 8 is a schematic diagram of a packet caching solution according to another embodiment of this application.

In another caching solution, a forwarding device forms a cache queue based on a flow ID and a cycle ID. FIG. 8 is a schematic diagram of a packet caching solution according to another embodiment of this application. As shown in FIG. 8, in this solution, the forwarding device allocates the cache queue based on the flow ID and the cycle ID. A packet of a packet flow #1 and a packet of a packet flow #2 (for example, packets in an upper left dashed-line box in FIG. 8) that are received in a first T1 cycle (for example, a cycle of the packet flow #1 or the packet flow #2 in FIG. 8) of a cycle (for example, a cycle of a packet flow #3 in FIG. 8) whose length is T3 enters Q1, a packet of the packet flow #1 and a packet of the packet flow #2 (for example, packets in an upper right dashed-line box in FIG. 8) that are received in a second T2 cycle (for example, the cycle of the packet flow #1 or the packet flow #2 in FIG. 8) of the cycle whose length is T3 enters Q2, and a packet of the packet flow #3 (for example, a packet in a lower left dashed-line box in FIG. 8) in the cycle whose length is T3 enters Q3. Therefore, when the cycle whose length is T3 ends, the Q1 includes one packet from the packet flow #1, and one packet from the packet flow #2, the Q2 includes one packet from the packet flow #1, and one packet from the packet flow #2, and the Q3 includes one packet from the packet flow #3.

Figure 9:
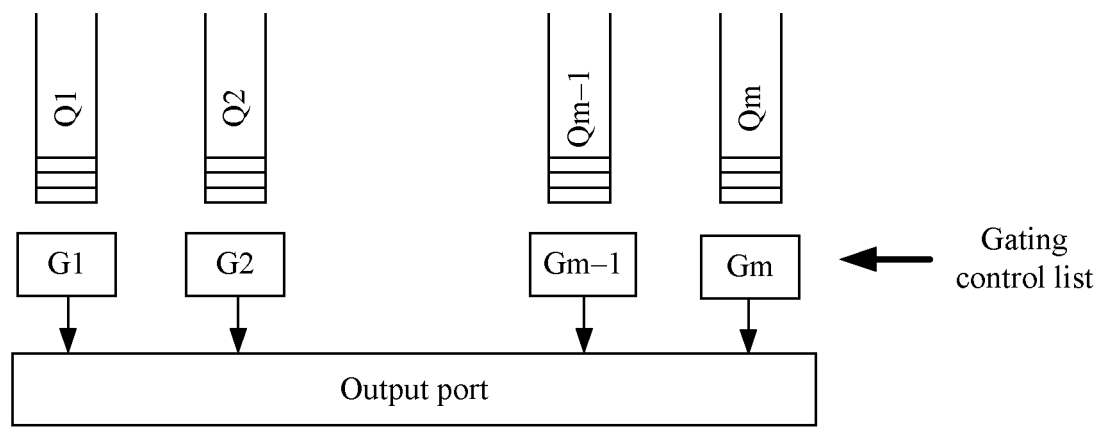
FIG. 9 is a schematic diagram of scheduling a packet from a cache queue according to an embodiment of this application.

A forwarding device performs scheduling at an output port based on a new constraint condition, and extracts a packet from each cache queue for output. FIG. 9 is a schematic diagram of scheduling a packet from a cache queue according to an embodiment of this application. As shown in FIG. 9, the forwarding device has m cache queues: Q1, Q2, . . . , Qm−1, and Qm. Each cache queue has a gating control switch that controls packet output, and the gating control switches are G1, G2, . . . , Gm−1, and Gm, respectively. The forwarding device turns on or turns off a corresponding gating control switch at a corresponding moment based on a preconfigured gating control list. To be specific, the forwarding device controls output of packets in N cache queues by controlling the gating control switch based on a gating control list corresponding to the new constraint condition. A specific form of the gating control list is described in detail below.

Further, a protection time may be set before each switching moment, that is, the forwarding device turns off a previous cache queue in advance to prevent a last packet sent by the previous cache queue from interfering with packet sending of a next cache queue in terms of transmission time. When no packet is extracted from a corresponding cache queue based on the new constraint condition, the output port may schedule a packet of a BG flow such that network link utilization can be improved.

In this embodiment of this application, in addition to scheduling the packet from the cache queue based on the gating control list and the gating control switch, the packet in the cache queue may be scheduled based on a write operation and a read operation. Further, when receiving a TSN packet flow, the forwarding device may generate a write operation instruction, and write a packet into a corresponding cache queue using a write pointer. The forwarding device may generate a read operation instruction based on the new constraint condition, read the packet from the corresponding cache queue using a read pointer, and forward the packet.

The foregoing describes two optional solutions for forwarding N TSN packet flows. One solution is to respectively store the N TSN packet flows in the N cache queues, where the N TSN packet flows are in a one-to-one correspondence with the N cache queues, and each cache queue has a gating control switch that controls packet output, and control output of the packets in the N cache queues by controlling the gating control switch based on the gating control list corresponding to the new constraint condition. The other solution is to extract a corresponding packet from the N TSN packet flows based on the new constraint condition, and store the packet in a first cache queue, where the packet in the first cache queue is a packet in a cycle in the new constraint condition, and output the packet in the first cache queue at a corresponding moment.

It should be understood that, in this embodiment of this application, forwarding of the N TSN packet flows may be controlled in another manner. For example, the forwarding device may be provided with a receiving cache and a sending cache, cache received packets of the N TSN packet flows in the receiving cache according to a preset rule, and then arrange the packets in the receiving cache for delivery based on the new constraint condition. For another example, the forwarding device may be provided with a multi-layer cache and performs multi-layer adjustment on packets such that the packets meet the new constraint condition and are sent. For still another example, if the forwarding device has a relatively strong processing capability, or a relatively small quantity of packet flows or packets need to be forwarded in a time segment, the forwarding device may directly forward the packet from an internal cache based on the new constraint condition. For still another example, because all forwarding devices in a network are configured in a unified manner, these forwarding devices cooperatively schedule the TSN packet flows. Therefore, when a proportion of the TSN packet flows in the network is relatively small, the forwarding device may predict arrival time of the TSN packet, and turns on the gating control switch in a corresponding time segment to implement cut-through switching of the packet. In this case, a quite small cache and a considerably short forwarding time are required. A specific implementation of forwarding the N TSN packet flows is not limited in this embodiment of this application.

Figure 10:
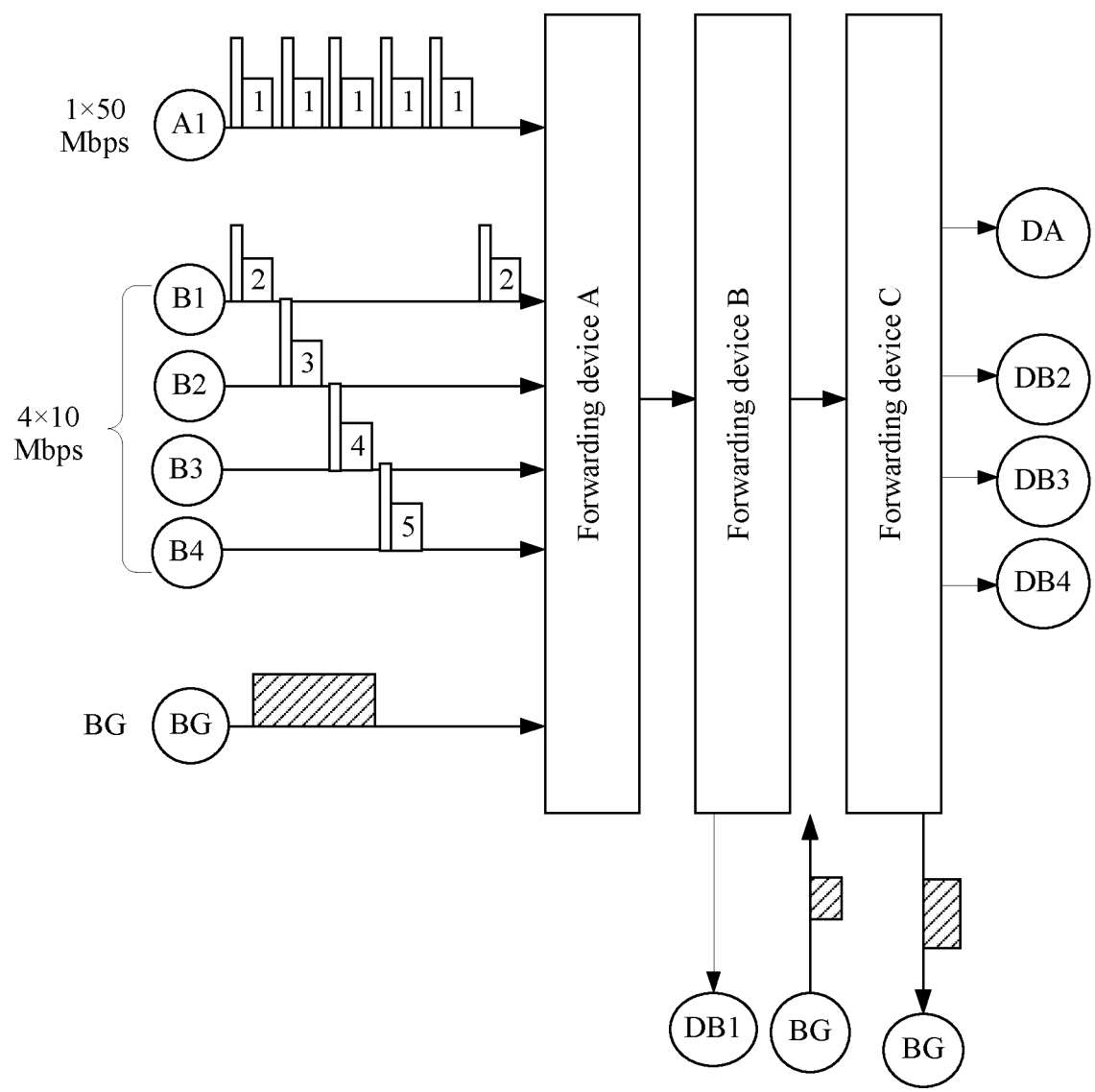
FIG. 10 is a schematic diagram of applying a packet forwarding method according to an embodiment of this application.

The following uses a specific example to describe a packet forwarding method in this embodiment of this application. FIG. 10 is a schematic diagram of a scenario of applying a packet forwarding method according to an embodiment of this application. FIG. 10 shows a scenario in which TSN packet flows are converged. A packet flow A1 and a packet flow B1 to a packet flow B4 are the TSN packet flows, that is, information sources of key data. A packet flow BG is with a low priority. All packet flows are converged on a forwarding device A, and an output port bandwidth of the forwarding device A is 100 megabits per second (Mbps). The packet flow A1 is a high-rate packet flow, and a bandwidth of 50 Mbps is required, and the packet flow B1 to the packet flow B4 each require a bandwidth of 10 Mbps. All of the packet flow A1 and the packet flow B1 to the packet flow B4 are periodical transmission packet flows. A cycle T1 of the packet flow A1 is one fifth of a cycle T2 of the packet flow B1 to the packet flow B4. Periodicity of the BG flow is not limited, and a transmission priority of the BG flow is the lowest. The BG flow may be scheduled in any bandwidth gap. Flow IDs of the packet flow A1, the packet flow B1 to the packet flow B4, and the BG flow may be A1, B1, B2, B3, B4, and BG, respectively.

Before packets of the packet flow A1 and the packet flow B1 to the packet flow B4 are sent, a bandwidth needs to be requested to a network, and a constraint condition that indicates periodicity of the packet flows needs to be registered. The packets of the packet flows start to be sent only when a confirmation message for the packet flows is received. Therefore, nodes in the network, that is, the forwarding device A, a forwarding device B, and a forwarding device C (a forwarding device is also referred to as a bridge device) all obtain the periodicity of the packet flow A1 and the packet flow B1 to the packet flow B4, and corresponding bandwidths are allocated to ensure latency quality of the key data. The packet forwarding method in this embodiment of this application may be applied to all forwarding devices in the network, for example, the forwarding device A, the forwarding device B, and the forwarding device C. It is assumed that there are clock differences and transmission jitter on all the forwarding devices and links in the network in this embodiment of this application. All the information sources and the forwarding devices periodically insert a delimitation packet when periodically sending packets. TSN packets between two adjacent delimitation packets form a group, and the grouped TSN packets are still forwarded as a group in a next-hop device. If there is no valid packet in one cycle, the delimitation packet also needs to be sent periodically.

Figure 11:
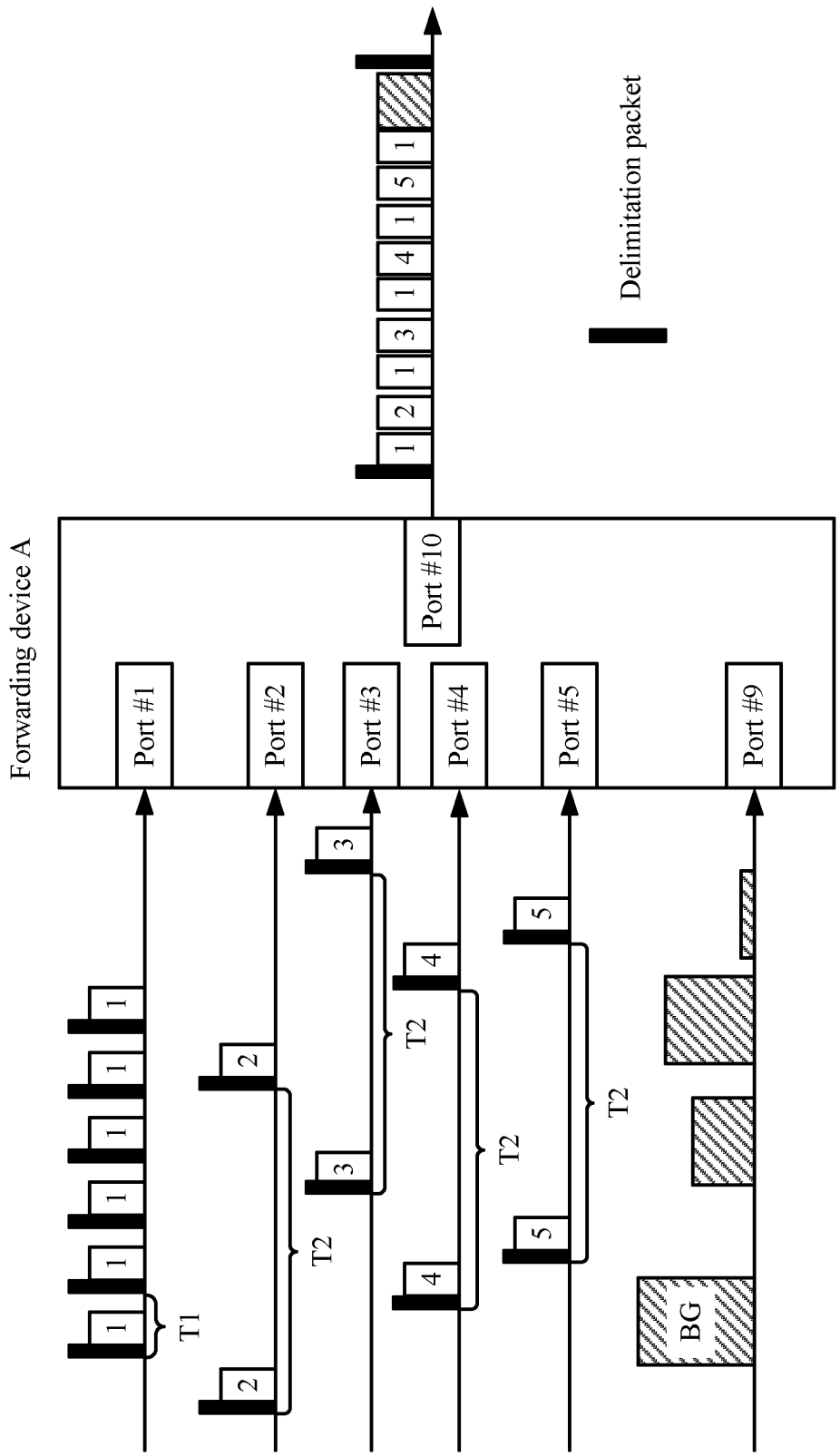
FIG. 11 is a schematic diagram of forwarding a packet flow by a forwarding device A according to an embodiment of this application.

FIG. 11 is a schematic diagram of forwarding a packet flow by a forwarding device A according to an embodiment of this application. As shown in FIG. 11, a packet flow A1 enters the forwarding device A from a port #1, a packet flow B1 to a packet flow B4 enter the forwarding device A from a port #2 to a port #5, respectively, and a BG flow enters the forwarding device A from a port #9. A frequency of the packet flow A1 is five times of a frequency of the packet flow B1 to the packet flow B4. In a case in which all devices in a network are clock asynchronized, there is no synchronization relationship between the packet flow A1 and the packet flow B1 to the packet flow B4. Packets may be sent to the forwarding device A at staggered time, or may arrive at the same time.

An output port #10 of the forwarding device A may configure a new hierarchical constraint condition through pre-calculation or preconfiguration. Because T2 is an integer multiple of T1, T2 may be used as a cycle of the port #10. A cycle includes 10 sub-cycles, and a sub-cycle is also referred to as a time slice. The 10 sub-cycles may be used to send the packet flow A1 or the packet flow B1 to the packet flow B4. In an idle sub-cycle, a BG flow with a low priority may be sent. Table 1 is a time slice schedule of the output port #10. The time slice schedule is a specific form of a gating control list. The gating control list in this embodiment of this application is not limited to a form of the time slice schedule listed in Table 1.

TABLE 1

Time slice schedule of an output port #10

| Time slice (sub-cycle) | 1 | 2 | 3 | 4 | 5 | 6 | 7 | 8 | 9 | 10 |
|---|---|---|---|---|---|---|---|---|---|---|
| Packet flow A1 | A1 |    | A1 |    | A1 |    | A1 |    | A1 |    |
| Packet flow B1 |    | B1 |    |    |    |    |    |    |    |    |
| Packet flow B2 |    |    |    | B2 |    |    |    |    |    |    |
| Packet flow B3 |    |    |    |    |    | B3 |    |    |    |    |
| Packet flow B4 |    |    |    |    |    |    |    | B4 |    |    |
| Background flow BG |    |    |    |    |    |    |    |    |    | BG |

Figure 12:
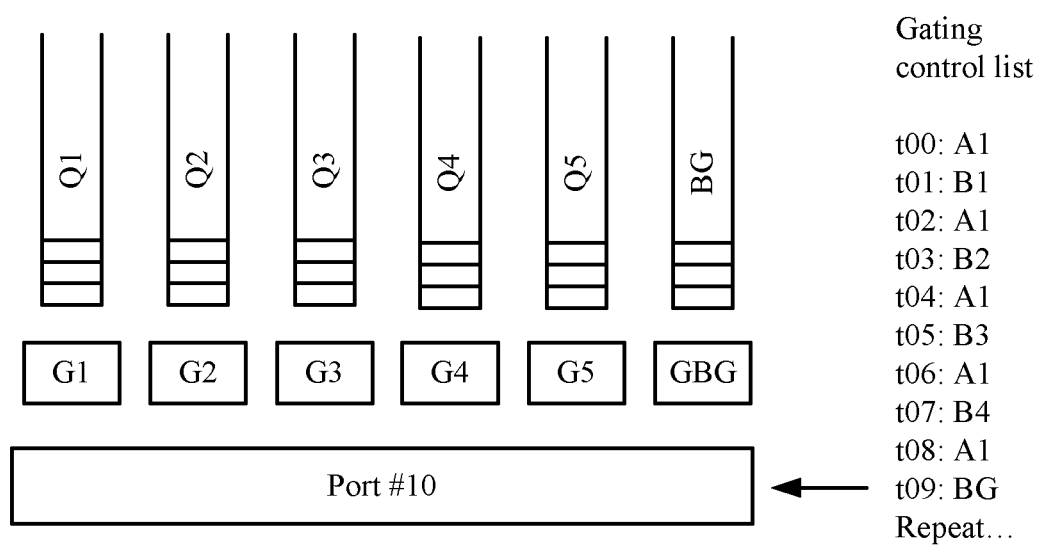
FIG. 12 is a schematic diagram of a cache queue of an output port according to an embodiment of this application.

In this embodiment, the forwarding device A respectively stores five TSN packet flows in five cache queues, and stores a background flow in one cache queue. FIG. 12 is a schematic diagram of a cache queue of an output port according to an embodiment of this application. As shown in FIG. 12, a packet flow A1 is cached in a cache queue Q1, a packet flow B1 is cached in a cache queue Q2, a packet flow B2 is cached in a cache queue Q3, a packet flow B3 is cached in a cache queue Q4, a packet flow B4 is cached in a cache queue Q5, and the BG flow is cached in a cache queue BG Each cache queue has a gating control switch, and the gating control switches are G1, G2, G3, G4, G5, and GBG, respectively. Content of a gating control list corresponds to a new constraint condition. The gating control list is used to control each switch in a corresponding time slice, schedule a packet from a corresponding cache queue, and then forward the packet. The gating control list may include time slice numbers in Table 1 and flow IDs of corresponding packet flows.

In this embodiment of this application, in addition to using the gating control list to control packet forwarding, a time slice forwarding table may be used to control packet forwarding. For a specific implementation of the time slice forwarding table, reference may be made to Table 2. In the implementation listed in Table 2, the time slice forwarding table may include a plurality of entries. Each entry includes an ID of one time slice and a packet ID corresponding to the time slice. The forwarding device determines current time based on time of a local clock, searches, based on the current time, the time slice forwarding table for an entry that matches the current time, and forwards a packet based on a packet ID in the matched entry. For example, the time slice forwarding table may include 60 entries, and the 60 entries respectively indicate 60 time slices (for example, a time slice #1, a time slice #2, . . . , and a time slice #60 listed in Table 2). The 60 time slices may be respectively corresponding to 60 seconds in one minute, where one time slice corresponds to one second. For example, it is assumed that current time is time (for example, 08:03:00:10) between 08:03:00 and 08:03:01, and in this case, the forwarding device may determine that the current time matches a first entry in the time slice forwarding table (an ID of a time slice is the time slice #1, and a packet ID is a packet #1). It is assumed that current time is time (for example, 08:03:01:15) between 08:03:01 and 08:03:02, and in this case, the forwarding device may determine that the current time matches a second entry in the time slice forwarding table (an ID of a time slice is the time slice #2, and a packet ID is a packet #2). For another example, it is assumed that current time is time (for example, 09:05:00:08) between 09:05:00 and 09:05:01, and in this case, the forwarding device may determine that the current time matches the first entry in the time slice forwarding table (the ID of the time slice is the time slice #1, and the packet ID is the packet #1). It is assumed that current time is 08:03:00:10, and in this case, the forwarding device may forward the packet based on the packet ID in the first entry. Further, a network processor of the forwarding device may obtain the current time from the local clock of the forwarding device. The local clock includes a register for recording current time. After obtaining the current time, the network processor may use the current time as a search keyword to search the time slice forwarding table for an entry that matches the current time. The packet ID may be a storage address of the packet in a memory. Packets in the memory may be updated based on an ID of a time slice. The network processor in the forwarding device may forward a packet by executing a read instruction. An operand of the read instruction may be a storage address of the packet.

TABLE 2

Time slice forwarding table of an output port #10

| ID of a time slice | Packet ID |
|---|---|
| Time slice #1 | Packet #1 |
| Time slice #2 | Packet #2 |
| . . . | . . . |
| Time slice #60 | Packet #60 |

Correspondingly, N TSN packet flows are respectively stored in N cache queues, where the N TSN packet flows are in a one-to-one correspondence with the N cache queues, and the N TSN packet flows in the N cache queues are forwarded based on the time slice forwarding table. Alternatively, the forwarding the N TSN packet flows based on a new constraint condition that defines duration of a single cycle, a maximum quantity of packets that are allowed to be transmitted in a single cycle, and a maximum length of a single packet may include respectively storing the N TSN packet flows in the N cache queues, where the N TSN packet flows are in a one-to-one correspondence with the N cache queues, and forwarding, based on the time slice forwarding table, the N TSN packet flows stored in the N cache queues.

It should be understood that the packet #1, the packet #2, . . . , and the packet #60 in Table 2 are respectively corresponding to corresponding packet flows in the N TSN packet flows, or in a BG flow. A first TSN packet flow in the N TSN packet flows is used as an example. A cycle of a packet that belongs to the first TSN packet flow and that is in the packet #1, the packet #2, . . . , and the packet #60 is still a cycle of the first TSN packet flow. A maximum length of a packet that belongs to the first TSN packet flow and that is in the packet #1, the packet #2, . . . , and the packet #60 still conforms to a maximum length of a single packet of the first TSN packet flow. A maximum quantity of packets that belong to the first TSN packet flow and that are in the packet #1, the packet #2, . . . , and the packet #60 is X times of a quantity of packets that are allowed to be transmitted in a single cycle of the first TSN packet flow (60 seconds are X times of the single cycle of the first TSN packet flow). That is, the first TSN packet flow is forwarded in a case in which a corresponding constraint condition is complied with. A case of another packet flow in the N TSN packet flows is similar to that of the first TSN packet flow, and details are not described herein again.

It should also be understood that, in this embodiment of this application, the N TSN packet flows may be respectively stored in the N cache queues, or may be stored in one or more caches. When forwarding a packet, the forwarding device directly finds a corresponding packet using a storage address in a packet ID. This is not limited in this embodiment of this application.

Figure 13:
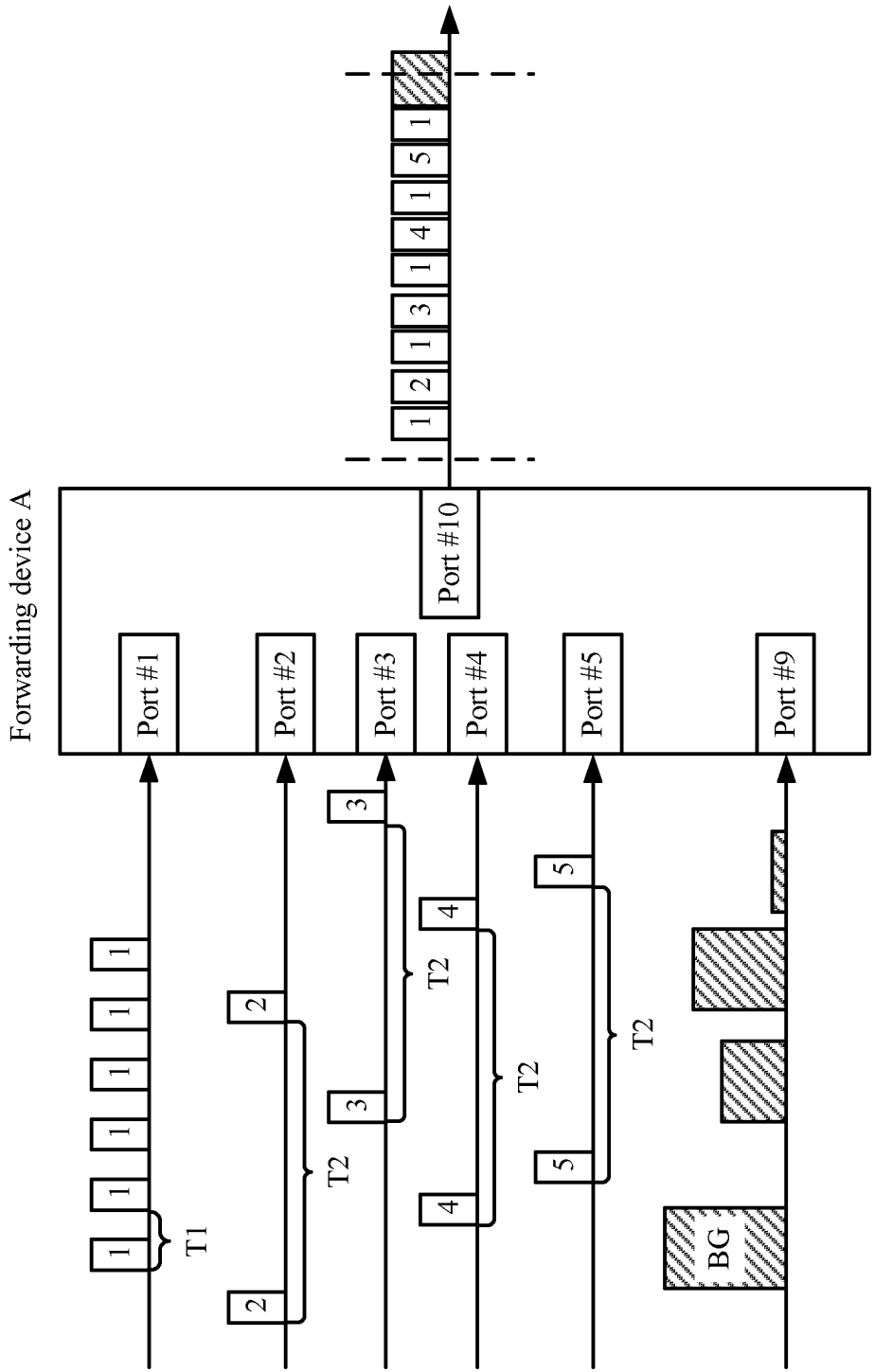
FIG. 13 is a schematic diagram of forwarding a packet flow by a forwarding device A according to another embodiment of this application.

It is assumed that all forwarding devices and links in a network in an embodiment of this application are clock synchronized. No delimitation packet needs to be inserted into a new packet flow obtained through convergence to divide a boundary of a cycle. FIG. 13 is a schematic diagram of forwarding a packet flow by a forwarding device A according to another embodiment of this application. Devices in a network are clock synchronized, and clock cycles for sending a TSN packet flow are planned in a unified manner according to the method in this embodiment of this application such that a conflict between packets on different input ports can be avoided, an internal cache of the forwarding device may be quite small, and a TSN packet can be forwarded in a fairly low latency. It should be noted that there are different levels of clock drifts in the protocol 1588 or another clock synchronization technology, and a latency and jitter occur in a link because of an interference factor such as a change of an external temperature environment, therefore, there is a specific error in global clock synchronization in the network. As shown in FIG. 13, in terms of cycle planning and scheduling, use of a time segment within an error range may be avoided, and a guard interval time segment may be set at the boundary of the cycle.

Figure 14:
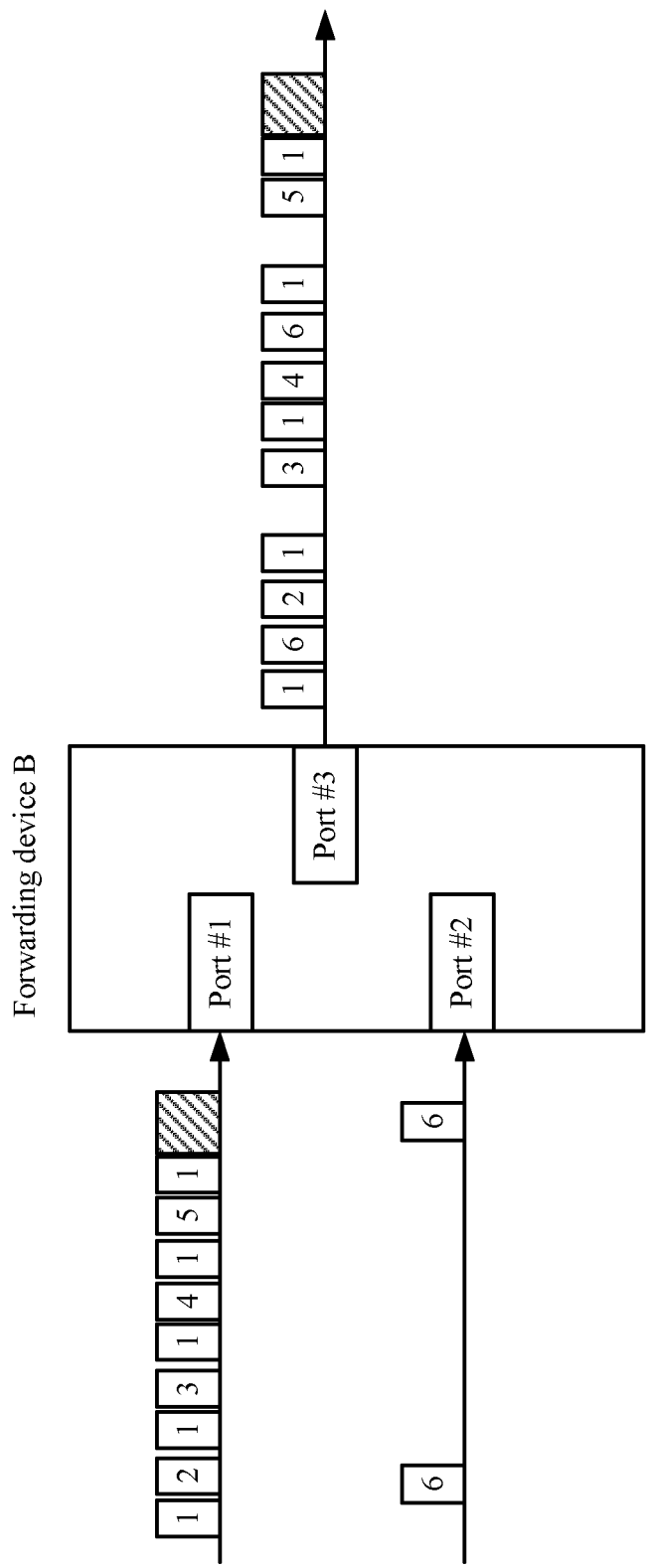
FIG. 14 is a schematic diagram of forwarding a packet flow by a forwarding device B according to an embodiment of this application.

It should be understood that input and output of a forwarding device B and a forwarding device C in this embodiment may be similar to those of the forwarding device A. FIG. 14 is a schematic diagram of forwarding a packet flow by a forwarding device B according to an embodiment of this application. In the example in FIG. 13, a plurality of packet flows is converged into one new packet flow on an output port of the forwarding device A, and the new packet flow is used as input of a port #1 of the forwarding device B in FIG. 14. The new packet flow is referred to as a packet flow M. From a perspective of the forwarding device B, the packet flow M is a packet flow that includes many packets. The forwarding device B needs to add a packet flow #6 (input from a port #2). An instantaneous conflict may occur when the packet flow M and the packet flow #6 are being sent. A bandwidth allocated by the forwarding device B for a TSN flow is definitely sufficient, and therefore a bandwidth of an output port #3 of the forwarding device B is definitely sufficient in a long term. That is, an idle time segment can be definitely found for inserting packets of the packet flow #6 into the packet flow M.

When an instantaneous conflict occurs, processing performed by the forwarding device B in this embodiment of this application may be classified into two cases. In one case, the forwarding device B has information (may be deployed through preconfiguration) about packet flows, in the packet flow M, that are before convergence. There may be a fixed configuration for the forwarding device B to merge the packet flow M and the packet flow #6, that is, there is a new fixed arrangement. The output port #3 of the forwarding device B converges the packet flow M and the packet flow #6 into one new packet flow (not shown in FIG. 14).

In the other case, the forwarding device B does not have information about packet flows, in the packet flow M, that are before convergence. Therefore, the forwarding device B needs to simply schedule the packet flow M and the packet flow #6 onto the same output port #3. In this case, a scheduling order of the packet flow M and the packet flow #6 may not be ensured. For example, scheduling may be performed in an order shown in FIG. 14. In the new packet flow obtained by converging the packet flow M and the packet flow #6, an interval of a packet 3 of an original packet flow #3 relative to the packet flow M has changed, but the packet 3 does not have a change in a cycle or an interval finally. According to the packet forwarding method in this embodiment of this application, a specific latency and jitter within a specific time range are allowed. Certainly, a precise latency may alternatively be set and no jitter is allowed. This is not limited in this embodiment of this application.

The following analyzes in detail an effect that may be brought by the packet forwarding method in this embodiment of this application. There is no constraint condition planning for a packet flow in a conventional IP network. When a plurality of packet flows is converged on one output port, a burst may occur if packets from a plurality of input ports simultaneously arrive at the output port. According to an existing Ethernet mechanism, it is only ensured that packets from a same input port are not out of order when being sent at the output port, and packets between different input ports may be scheduled from a queue in any order. A network burst may occupy a large amount of cache space and instantaneously increase a latency or cause a packet loss because of insufficient cache space. According to the packet forwarding method in this embodiment of this application, a new constraint condition of the new converged packet flow is planned such that a packet flow conflict can be effectively avoided, thereby avoiding a packet loss, a latency, and jitter, and completing packet storage and forwarding within an expectable period.

In addition, a hierarchical cycle provided in the packet forwarding method in this embodiment of this application enables a high-rate packet flow and a low-rate packet flow to be output alternately, and high-rate packet flows are evenly distributed, as many as possible, at time slices of an output port. This can avoid a packet burst that occurs when a large quantity of low-rate packet flows that simultaneously arrive block packets of the high-rate packet flow.

Moreover, because of uncertainty of a traffic mode of the conventional IP network, allocation of 100% of bandwidths cannot be implemented in live network planning. When user traffic reaches 50% or less, upgrading of an interface bandwidth is considered to avoid a packet loss and a latency increase. The packet forwarding method in this embodiment of this application is based on preset cycle planning, and can support a port in forwarding key data approximately at a full rate. A packet may be forwarded in a latency at a specified upper limit in the forwarding device.

The foregoing describes the packet forwarding method in this embodiment of this application. The following describes in detail a forwarding device and a network device in the embodiments of this application.

Figure 15:
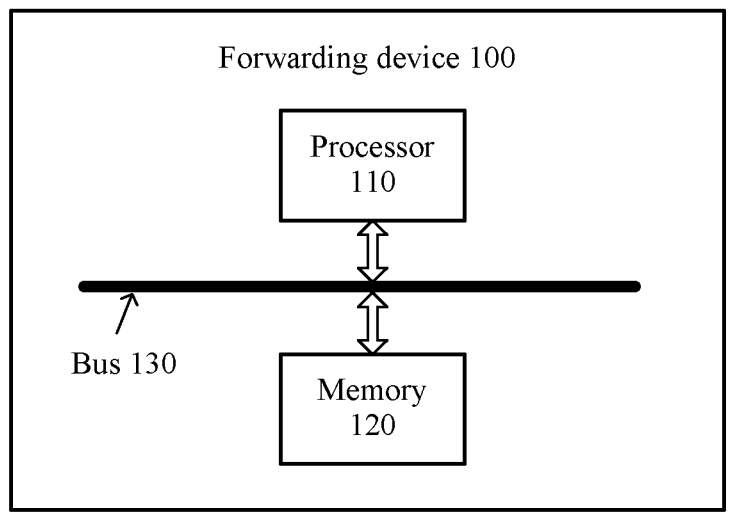
FIG. 15 is a schematic block diagram of a forwarding device according to an embodiment of this application.

FIG. 15 is a schematic block diagram of a forwarding device 100 according to an embodiment of this application. The forwarding device 100 may be configured to perform the method described in the embodiment corresponding to FIG. 1. As shown in FIG. 15, the forwarding device 100 may include a processor 110 and a memory 120. The processor 110 may be connected to the memory 120 using a bus 130. The memory 120 is configured to store an instruction. When the processor 110 executes the instruction stored in the memory 120, the processor 110 is enabled to perform the following steps of receiving N TSN packet flows, where each of the N TSN packet flows corresponds to a constraint condition that defines duration of a single cycle, a maximum quantity of packets that are allowed to be transmitted in a single cycle, and a maximum length of a single packet, and N is a positive integer greater than or equal to 2, and forwarding the N TSN packet flows based on a new constraint condition that defines duration of a single cycle, a maximum quantity of packets that are allowed to be transmitted in a single cycle, and a maximum length of a single packet, where each TSN packet flow is forwarded in a case in which a corresponding constraint condition is complied with, and the new constraint condition is determined based on the constraint condition corresponding to each of the N TSN packet flows.

For example, the forwarding device 100 may include at least one receiver (not shown in FIG. 15), and the processor 110 may receive the N TSN packet flows using the at least one receiver. The forwarding device 100 may include at least one transmitter (not shown in FIG. 15), and the processor 110 may forward the N TSN packet flows using the at least one transmitter.

The forwarding device in this embodiment of this application configures a new constraint condition in a scenario in which a plurality of TSN packet flows are forwarded such that each TSN packet flow is forwarded in a case in which a constraint condition corresponding to the TSN packet flow is complied with. This helps reduce jitter of a packet during forwarding, and can improve resource utilization and forwarding efficiency of forwarding the packet by a system.

Optionally, in an embodiment, the duration of a single cycle in the new constraint condition may be an LCM of the duration of a single cycle in the constraint conditions corresponding to the N TSN packet flows.

Optionally, in an embodiment, the forwarding, by the processor 110, the N TSN packet flows based on a new constraint condition that defines duration of a single cycle, a maximum quantity of packets that are allowed to be transmitted in a single cycle, and a maximum length of a single packet may include forwarding the N TSN packet flows based on the new constraint condition, where a first packet is sent at a start time of a cycle corresponding to the new constraint condition, and the first packet carries delimitation information used to indicate the start time of the cycle corresponding to the new constraint condition, and/or a second packet is sent at an end time of the cycle corresponding to the new constraint condition, and the second packet carries delimitation information used to indicate the end time of the cycle corresponding to the new constraint condition.

Optionally, in an embodiment, the cycle corresponding to the new constraint condition may include a security center time segment and a guard interval time segment, and a packet in the N TSN packet flows may be forwarded in the security center time segment.

Optionally, in an embodiment, before the processor 110 forwards the N TSN packet flows based on the new constraint condition that defines the duration of a single cycle, the maximum quantity of packets that are allowed to be transmitted in a single cycle, and the maximum length of a single packet, the processor 110 may be further configured to receive information that is used to indicate the new constraint condition and that is sent by a network configuration device, and determine the new constraint condition based on the information used to indicate the new constraint condition.

Optionally, in an embodiment, the forwarding, by the processor 110, the N TSN packet flows based on a new constraint condition that defines duration of a single cycle, a maximum quantity of packets that are allowed to be transmitted in a single cycle, and a maximum length of a single packet may include respectively storing the N TSN packet flows in N cache queues, where the N TSN packet flows are in a one-to-one correspondence with the N cache queues, and each cache queue has a gating control switch that controls packet output, and controlling output of packets in the N cache queues by controlling the gating control switch based on a gating control list corresponding to the new constraint condition.

Figure 16:
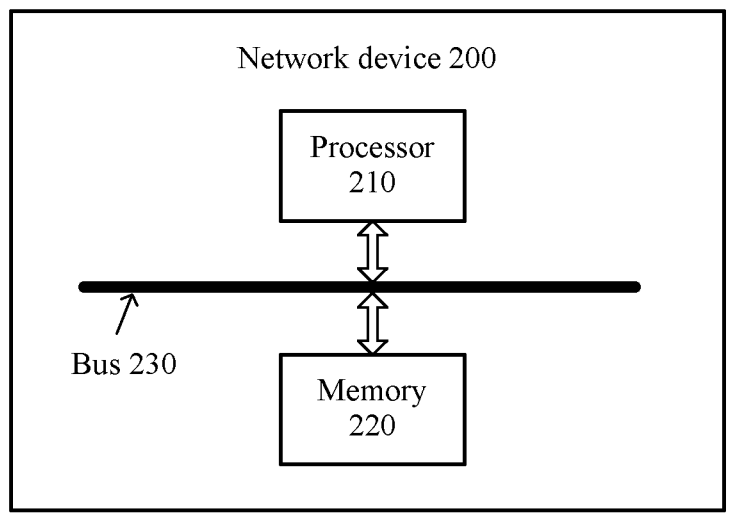
FIG. 16 is a schematic block diagram of a network device according to an embodiment of this application.

FIG. 16 is a schematic block diagram of a network device 200 according to an embodiment of this application. The network device 200 may be configured to perform the method described in the embodiment corresponding to FIG. 1. As shown in FIG. 16, the network device 200 may include a processor 210 and a memory 220. The processor 210 may be connected to the memory 220 using a bus 230. The memory 220 is configured to store an instruction. When the processor 210 executes the instruction stored in the memory 220, the processor 210 is enabled to perform the following steps of obtaining a constraint condition that corresponds to each of N TSN packet flows and that defines duration of a single cycle, a maximum quantity of packets that are allowed to be transmitted in a single cycle, and a maximum length of a single packet, where N is a positive integer greater than or equal to 2, and determining, based on the constraint condition of each of the N TSN packet flows, a new constraint condition that defines duration of a single cycle, a maximum quantity of packets that are allowed to be transmitted in a single cycle, and a maximum length of a single packet, where when the new constraint condition is used by a forwarding device to forward the N TSN packet flows, each TSN packet flow is forwarded in a case in which a corresponding constraint condition is complied with.

For example, the network device 200 may include at least one receiver (not shown in FIG. 16), and the processor 210 may receive the constraint conditions of the N TSN packet flows using the at least one receiver. The network device 200 may further include at least one transmitter (not shown in FIG. 16) such that the processor sends the new constraint condition to a corresponding forwarding device using the at least one transmitter. This is not limited in this embodiment of this application.

The network device in this embodiment of this application configures a new constraint condition in a scenario in which a plurality of TSN packet flows are forwarded such that each TSN packet flow is forwarded in a case in which a constraint condition corresponding to the TSN packet flow is complied with. This helps reduce jitter of a packet during forwarding, and can improve resource utilization and forwarding efficiency of forwarding the packet by a system.

Optionally, in an embodiment, the duration of a single cycle in the new constraint condition may be an LCM of the duration of a single cycle in the constraint conditions corresponding to the N TSN packet flows.

Optionally, in an embodiment, the new constraint condition defines that a first packet is sent at a start time of a cycle corresponding to the new constraint condition, and the first packet carries delimitation information used to indicate the start time of the cycle corresponding to the new constraint condition, and/or a second packet is sent at an end time of the cycle corresponding to the new constraint condition, and the second packet carries delimitation information used to indicate the end time of the cycle corresponding to the new constraint condition.

Optionally, in an embodiment, the cycle corresponding to the new constraint condition may include a security center time segment and a guard interval time segment, and a packet in the N TSN packet flows may be forwarded in the security center time segment.

Optionally, in an embodiment, the N TSN packet flows are respectively stored in N cache queues, output of packets in the N cache queues is controlled by controlling a gating control switch based on a gating control list corresponding to the new constraint condition, and the N TSN packet flows are in a one-to-one correspondence with the N cache queues, and each cache queue has the gating control switch that controls packet output.

Figure 17:
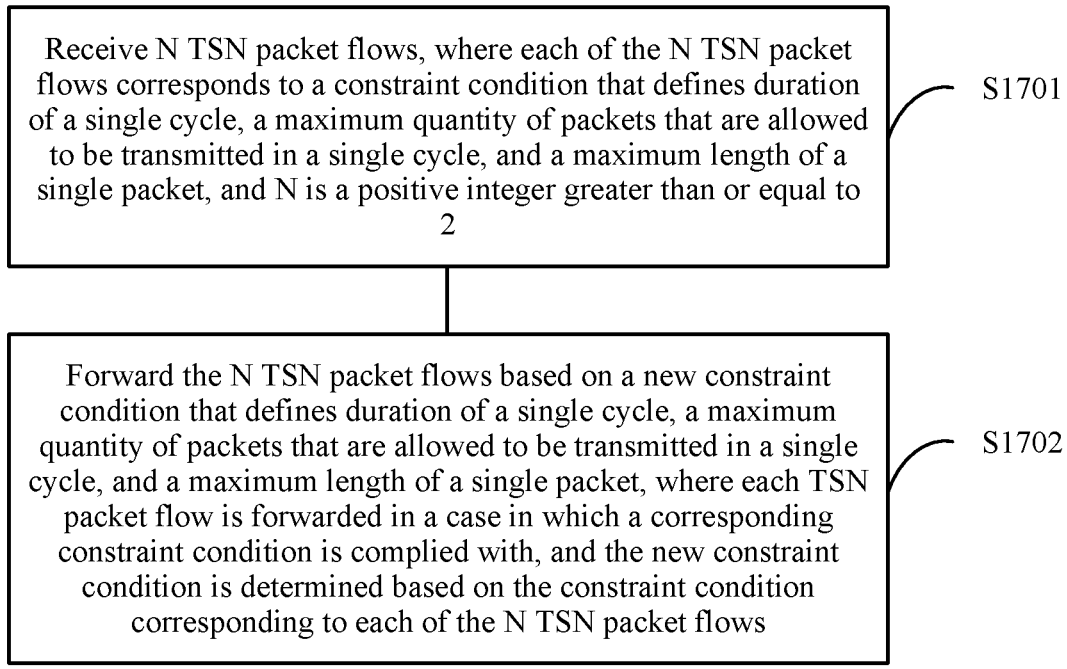
FIG. 17 is a schematic flowchart of a packet forwarding method according to an embodiment of this application.

FIG. 17 is a schematic flowchart of a packet forwarding method according to an embodiment of this application. For example, the forwarding device 100 shown in FIG. 15 may perform the method shown in FIG. 17. Referring to FIG. 17, the method may include S1701 and S1702.

S1701. Receive N TSN packet flows, where each of the N TSN packet flows corresponds to a constraint condition that defines duration of a single cycle, a maximum quantity of packets that are allowed to be transmitted in a single cycle, and a maximum length of a single packet, where N is a positive integer greater than or equal to 2.

S1702. Forward the N TSN packet flows based on a new constraint condition that defines duration of a single cycle, a maximum quantity of packets that are allowed to be transmitted in a single cycle, and a maximum length of a single packet, where each TSN packet flow is forwarded in a case in which a corresponding constraint condition is complied with, and the new constraint condition is determined based on the constraint condition corresponding to each of the N TSN packet flows.

Figure 18:
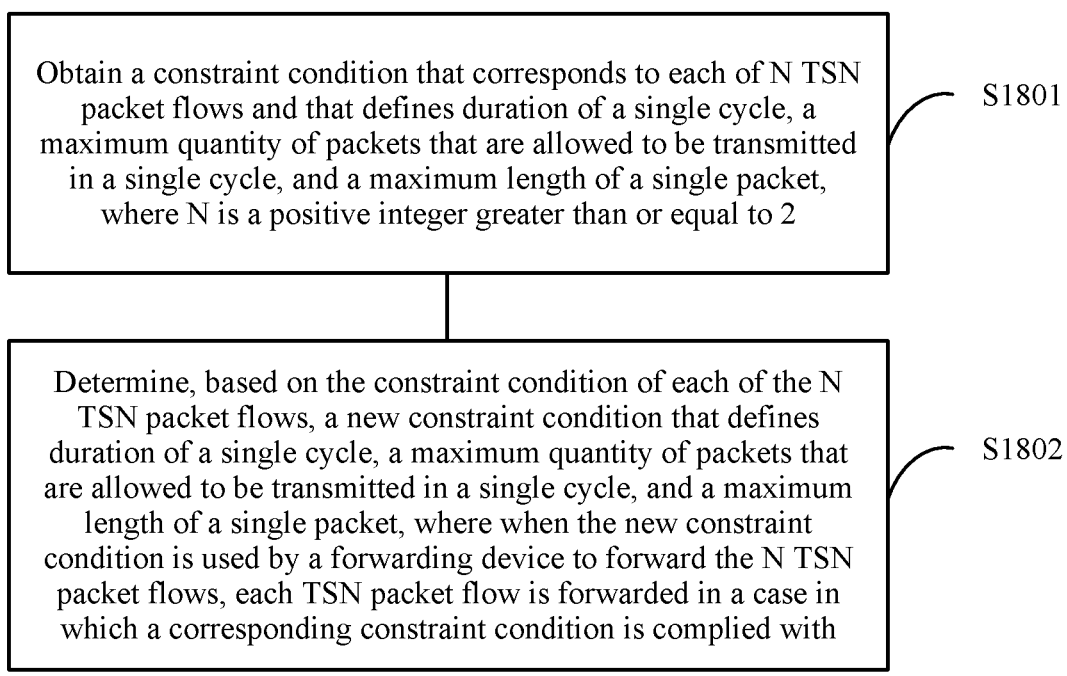
FIG. 18 is a schematic flowchart of a packet forwarding method according to an embodiment of this application.

FIG. 18 is a schematic flowchart of a packet forwarding method according to an embodiment of this application. For example, the network device 200 shown in FIG. 16 may perform the method shown in FIG. 18. Referring to FIG. 18, the method may include S1801 and S1802.

S1801. Obtain a constraint condition that corresponds to each of N TSN packet flows and that defines duration of a single cycle, a maximum quantity of packets that are allowed to be transmitted in a single cycle, and a maximum length of a single packet, where N is a positive integer greater than or equal to 2.

S1802. Determine, based on the constraint condition of each of the N TSN packet flows, a new constraint condition that defines duration of a single cycle, a maximum quantity of packets that are allowed to be transmitted in a single cycle, and a maximum length of a single packet, where when the new constraint condition is used by a forwarding device to forward the N TSN packet flows, each TSN packet flow is forwarded in a case in which a corresponding constraint condition is complied with.

Figure 19:
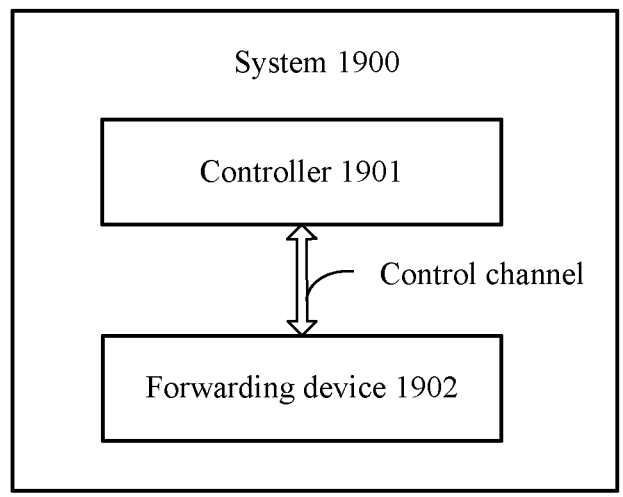
FIG. 19 is a schematic block diagram of a system according to an embodiment of this application.

FIG. 19 is a schematic block diagram of a system 1900 according to an embodiment of this application. Referring to FIG. 19, the system 1900 includes a controller 1901 and a forwarding device 1902. For example, the controller 1901 may perform the method shown in FIG. 18, and the forwarding device 1902 may perform the method shown in FIG. 17. The controller 1901 may be a software-defined networking (SDN) controller. The forwarding device 1902 may be an OPENFLOW switch. The controller 1901 may communicate with the forwarding device 1902 using a control channel. The controller 1901 may obtain constraint conditions of N TSN packet flows from the forwarding device 1902 by executing OPENFLOW Switch Specification 1.3.1. The controller 1901 may perform S1801 based on the constraint conditions of the N TSN packet flows from the forwarding device 1902. After determining a new constraint condition by performing S1802, the controller 1901 may send the new constraint condition to the forwarding device 1902 using the control channel.

Figure 20:
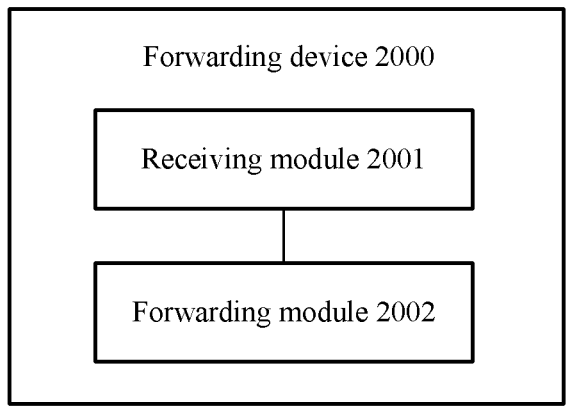
FIG. 20 is a schematic block diagram of a forwarding device according to another embodiment of this application.

FIG. 20 is a schematic block diagram of a forwarding device 2000 according to another embodiment of this application. Referring to FIG. 20, the forwarding device 2000 may include a receiving module 2001 and a forwarding module 2002. The receiving module 2001 may perform S1701 of the method shown in FIG. 17, and the forwarding module 2002 may perform S1702 of the method shown in FIG. 17. The receiving module 2001 and the forwarding module 2002 may perform functions of the processor 110 in the forwarding device 100 shown in FIG. 15.

Figure 21:
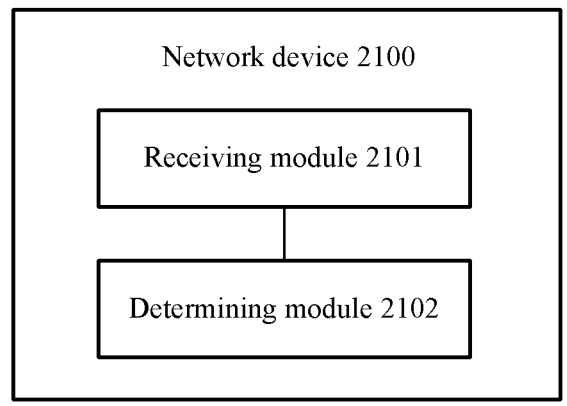
FIG. 21 is a schematic block diagram of a network device according to another embodiment of this application.

FIG. 21 is a schematic block diagram of a network device 2100 according to another embodiment of this application. Referring to FIG. 21, the network device 2100 may include a receiving module 2101 and a determining module 2102. The receiving module 2001 may perform S1801 of the method shown in FIG. 18, and the determining module 2102 may perform S1802 of the method shown in FIG. 18. The receiving module 2101 and the determining module 2102 may perform functions of the processor 210 in the network device 200 shown in FIG. 16.

It should be understood that the processor mentioned in the embodiments of this application may be a central processing unit (CPU), or may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor or the processor may be any conventional processor or the like.

It should also be understood that the memory mentioned in the embodiments of this application may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), and is used as an external cache. As an example but not a limitation, many forms of RAMs are available, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

It should be noted that the memory (a storage module) is integrated into the processor when the processor is the general purpose processor, the DSP, the ASIC, the FPGA or the other programmable logic device, the discrete gate or the transistor logic device, or the discrete hardware component.

It should be noted that the memory described in this specification is intended to include but is not limited to these memories and any proper type of memory.

An embodiment of this application further provides a forwarding device, where the forwarding device includes a module configured to perform the method in the embodiments of this application.

An embodiment of this application further provides a network device, where the network device includes a module configured to perform the method in the embodiments of this application.

An embodiment of this application further provides a computer storage medium, where the computer storage medium stores an instruction, and when the instruction runs on a computing device, the computing device is enabled to perform the method in the embodiments of this application.

An embodiment of this application further provides a computer application program, where the computer application program includes an instruction, and when the instruction runs on a computing device, the computing device is enabled to perform the method in the embodiments of this application.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, reference may be to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual needs to achieve the objectives of the solutions of the embodiments.

In addition, functional units in the embodiments of this application may be integrated into one processing unit, or each of the units may exist alone physically, or at least two units are integrated into one unit.

When the functions are implemented in a form of a software functional unit and sold or used as an independent product, the functions may be stored in a computer-readable storage medium. Based on such an understanding, the technical solutions of this application essentially or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packet forwarding method comprising:
    receiving a plurality of Time-Sensitive Networking (TSN) packet flows, wherein each of the TSN packet flows corresponds to one of a plurality of constraint conditions that defines a duration of a cycle, a maximum quantity of packets that are allowed to be transmitted in the cycle, and a maximum length of a transmitted packet, and wherein the TSN packet flows are packet flows communicated in a TSN network; and
    forwarding the TSN packet flows based on a new constraint condition, wherein the new constraint condition is based on the constraint conditions, wherein the new constraint condition defines a new duration of a new cycle, a new maximum quantity of new packets that are allowed to be transmitted in the new cycle, and a new maximum length of a new packet, and wherein the new constraint condition complies with each of the constraint conditions.

2. The packet forwarding method of claim 1, wherein the new duration is a lowest common multiple (LCM) of a duration set, and wherein the duration set comprises durations of cycles in the plurality of constraint conditions.

3. The packet forwarding method of claim 1, wherein forwarding the TSN packet flows further comprises:
    sending a first packet at a start time of the new cycle, wherein the first packet carries first delimitation information indicating the start time of the new cycle; or sending a second packet at an end time of the new cycle, wherein the second packet carries second delimitation information indicating the end time of the new cycle.

4. The packet forwarding method of claim 1, wherein the new cycle comprises a security center time segment and a guard interval time segment, and wherein the packet forwarding method further comprises forwarding the new packets during the security center time segment.

5. The packet forwarding method of claim 1, wherein before forwarding the TSN packet flows, the packet forwarding method further comprises:
receiving information indicating the new constraint condition from a network configuration device; and
determining the new constraint condition based on the information.

6. The packet forwarding method of claim 1, wherein forwarding the TSN packet flows further comprises:
storing the TSN packet flows in a plurality of cache queues, wherein the TSN packet flows are in a one-to-one correspondence with the cache queues; and
forwarding, based on a time slice forwarding table, the TSN packet flows stored in the cache queues.

7. A packet forwarding method comprising:
obtaining a plurality of constraint conditions corresponding to a plurality of Time-Sensitive Networking (TSN) packet flows, wherein each of the constraint conditions defines a duration of a cycle, a maximum quantity of packets that are allowed to be transmitted in the cycle, and a maximum length of a transmitted packet, and wherein the TSN packet flows are packet flows communicated in a TSN network; and
determining, based on the constraint conditions, a new constraint condition that defines a new duration of a new cycle, a new maximum quantity of new packets that are allowed to be transmitted in the new cycle, and a new maximum length of each of the new packets, wherein the new constraint condition enables a forwarding device to forward the TSN packet flows in compliance with a the constraint conditions.

8. The packet forwarding method of claim 7, wherein the new duration is a lowest common multiple (LCM) of a duration set, and wherein the duration set comprises durations of cycles in the plurality of constraint conditions.

9. The packet forwarding method of claim 7, wherein the new constraint condition is:
a first packet is to be sent at a start time of the new cycle, wherein the first packet carries first delimitation information indicating the start time; or
a second packet is to be sent at an end time of the new cycle, wherein the second packet carries second delimitation information indicating the end time.

10. The packet forwarding method of claim 7, wherein the new cycle comprises a security center time segment and a guard interval time segment, and wherein the new packets are configured to be forwarded during the security center time segment.

11. The packet forwarding method of claim 7, wherein the TSN packet flows are to be stored in a plurality of cache queues, wherein the TSN packet flows are in a one-to-one correspondence with the cache queues, and wherein the TSN packet flows in the cache queues are to be forwarded based on a time slice forwarding table.

12. A forwarding device comprising:
a memory configured to store instructions; and
a processor coupled to the memory, wherein the instruc tions cause the processor to be configured to:
receive a plurality of Time-Sensitive Networking (TSN) packet flows, wherein each of the TSN packet flows corresponds to one of a plurality of constraint conditions that defines a duration of a cycle, a maximum quantity of packets that are allowed to be transmitted in the cycle, and a maximum length of a transmitted packet, and wherein the TSN packet flows are packet flows communicated in a TSN network; and
forward the TSN packet flows based on a new constraint condition, wherein the new constraint condition is based on the constraint conditions, wherein the new constraint condition defines a new duration of a new cycle, a new maximum quantity of new packets that are allowed to be transmitted in the new cycle, and a new maximum length of a new packet, and wherein the new constraint condition complies with each of the constraint conditions.

13. The forwarding device of claim 12, wherein the new duration is a lowest common multiple (LCM) of a duration set, and wherein the duration set comprises durations of cycles in the plurality of constraint conditions.

14. The forwarding device of claim 12, wherein the instructions further cause the processor to be configured to:
send a first packet at a start time of the new cycle, wherein the first packet carries first delimitation information indicating the start time; or
send a second packet at an end time of the new cycle, wherein the second packet carries second delimitation information indicating the end time.

15. The forwarding device of claim 12, wherein the new cycle comprises a security center time segment and a guard interval time segment, and wherein the instructions further cause the processor to be configured to forward the new packets during the security center time segment.

16. The forwarding device of claim 12, wherein before forwarding the TSN packet flows, the instructions further cause the processor to be configured to:
receive information indicating the new constraint condition from a network configuration device; and
determine the new constraint condition based on the information.

17. The forwarding device of claim 12, wherein the instructions further cause the processor to be configured to:
store the TSN packet flows in a plurality of cache queues, wherein the TSN packet flows are in a one-to-one correspondence with the cache queues; and
forward, based on a time slice forwarding table, the TSN packet flows stored in the cache queues.

18. A network device comprising:
a memory configured to store instructions; and
a processor coupled to the memory, wherein the instructions cause the processor to be configured to:
obtain a plurality of constraint conditions corresponding to a plurality of Time-Sensitive Networking (TSN) packet flows, wherein each of the plurality of constraint conditions defines a duration of a cycle, a maximum quantity of packets that are allowed to be transmitted in the cycle, and a maximum length of a transmitted packet, and wherein the TSN packet flows are packet flows communicated in a TSN network; and
determine, based on the constraint conditions, a new constraint condition that defines a new duration of a new cycle, a new maximum quantity of new packets that are allowed to be transmitted in the new cycle, and a new maximum length of each of the new packets, wherein the new constraint condition enables a forwarding device to forward the TSN packet flows in compliance with the constraint conditions.

19. The network device of claim 18, wherein the new duration is a lowest common multiple (LCM) of a duration set, and wherein the duration set comprises durations of cycles in the plurality of constraint conditions.

20. The network device of claim 18, wherein the new constraint condition is configured to define:
   a first packet is to be sent at a start time of the new cycle, wherein the first packet carries first delimitation information indicating the start time; or
   a second packet is to be sent at an end time of the new cycle, wherein the second packet carries second delimitation information indicating the end time.

21. The network device of claim 18, wherein the new cycle comprises a security center time segment and a guard interval time segment, and wherein the new packets are configured to be forwarded during the security center time segment.

22. The network device of claim 18, wherein the TSN packet flows are to be stored in a plurality of cache queues, wherein the TSN packet flows are in a one-to-one correspondence with the cache queues, and wherein the TSN packet flows in the cache queues are to be forwarded based on a time slice forwarding table.

\* \* \* \* \*